US007250691B2

(12) United States Patent
Enis et al.

(10) Patent No.: US 7,250,691 B2
(45) Date of Patent: Jul. 31, 2007

(54) METHOD AND APPARATUS FOR USING WIND TURBINES TO GENERATE AND SUPPLY UNINTERRUPTED POWER TO LOCATIONS REMOTE FROM THE POWER GRID

(76) Inventors: Ben M. Enis, 2533 New Morning, Henderson, NV (US) 89052; Paul Lieberman, 19815 Mildred Ave., Torrance, CA (US) 90503-1121

( * ) Notice: Subject to any disclaimer, the term of this patent is extended or adjusted under 35 U.S.C. 154(b) by 0 days.

(21) Appl. No.: 11/450,174

(22) Filed: Jun. 12, 2006

(65) Prior Publication Data

US 2006/0232895 A1    Oct. 19, 2006

(51) Int. Cl.
*F03D 9/02*     (2006.01)
*G01W 1/00*    (2006.01)
(52) U.S. Cl. ............................................. 290/55; 702/3
(58) Field of Classification Search .............. 702/1–18; 290/44–56
See application file for complete search history.

(56) References Cited

U.S. PATENT DOCUMENTS

| 320,482 | A | 6/1885 | Leavitt |
|---|---|---|---|
| 874,140 | A | 12/1907 | Valiquet |
| 1,231,051 | A | 6/1917 | Nordberg |
| 2,179,885 | A | 11/1939 | Fumagalli |
| 2,230,526 | A | 2/1941 | Claytor |
| 2,475,252 | A | 7/1949 | Phinney |
| 2,539,862 | A | 1/1951 | Rushing |
| 2,652,699 | A | 9/1953 | Romani |
| 3,151,250 | A | 9/1964 | Carlson |
| 3,677,008 | A | 7/1972 | Koutz |
| 3,806,733 | A | 4/1974 | Haanen |
| 3,979,597 | A | 9/1976 | Drucker |
| 4,055,950 | A | 11/1977 | Grossman |
| 4,118,637 | A | 10/1978 | Tackett |
| 4,167,372 | A | 9/1979 | Tackett |
| 4,206,608 | A | 6/1980 | Bell |
| 4,229,661 | A | 10/1980 | Mead et al. |
| 4,236,083 | A | 11/1980 | Kenney |
| 4,304,103 | A | 12/1981 | Hamrick et al. |
| 4,358,250 | A | 11/1982 | Payne |
| 4,441,872 | A | 4/1984 | Seale |
| 4,447,738 | A | 5/1984 | Allison |
| 4,455,834 | A | 6/1984 | Earle |
| 4,525,631 | A | 6/1985 | Allison |
| 4,648,801 | A | 3/1987 | Wilson |
| 4,735,552 | A | 4/1988 | Watson |

(Continued)

FOREIGN PATENT DOCUMENTS

DE          2717679         10/1978

(Continued)

*Primary Examiner*—John Barlow
*Assistant Examiner*—Victor J. Taylor
(74) *Attorney, Agent, or Firm*—J. John Shimazaki

(57) ABSTRACT

The present invention relates to a wind energy generating and storing system comprising methods and apparatuses for providing energy dedicated for immediate use and energy storage, to provide electrical power on an uninterrupted and continuous basis, to locations remote from an electrical power grid. In a large application, the invention contemplates having a predetermined number of windmills dedicated for immediate use, and a predetermined number of windmills dedicated for energy storage, as compressed air energy in one or more high pressure tanks. A hybrid windmill having the ability to simultaneously switch between energy for immediate use and energy storage can also be provided.

20 Claims, 14 Drawing Sheets

Hybrid Wind Turbine System

U.S. PATENT DOCUMENTS

| | | |
|---|---|---|
| 5,140,170 A | 8/1992 | Henderson |
| 5,155,375 A | 10/1992 | Holley |
| 5,206,537 A | 4/1993 | Alejandro et al. |
| 5,384,489 A | 1/1995 | Bellac |
| 5,436,508 A | 7/1995 | Sorensen |
| 5,512,787 A | 4/1996 | Dederick |
| 5,537,822 A | 7/1996 | Shnaid et al. |
| 5,592,028 A | 1/1997 | Pritchard |
| 5,642,629 A | 7/1997 | Ohman |
| 5,685,155 A | 11/1997 | Brown et al. |
| 5,924,283 A | 7/1999 | Burke, Jr. |
| 6,527,671 B2 | 3/2003 | Paalasmaa et al. |
| 6,581,394 B1 | 6/2003 | Smolenskiy |

FOREIGN PATENT DOCUMENTS

| | | |
|---|---|---|
| DE | 4339402 | 5/1995 |
| EP | 307517 | 3/1989 |
| EP | 1022838 | 7/2000 |
| JP | 09317495 | 12/1997 |
| JP | 11280638 | 10/1999 |
| JP | 2003083230 | 3/2003 |
| WO | WO 9821474 | 5/1998 |
| WO | WO 0152379 | 7/2001 |

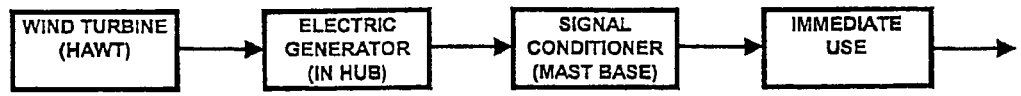
Figure 1. "Conventional" Horizontal Axis Wind Turbine (HAWT) System
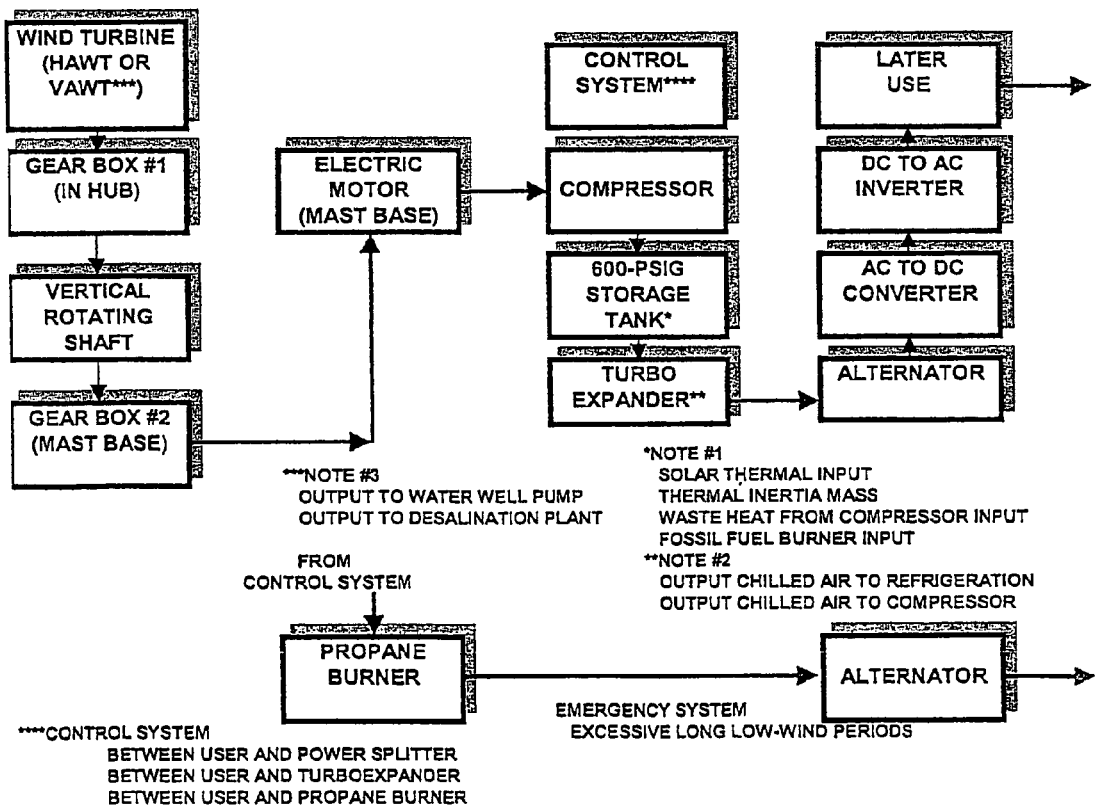
Figure 2. "Modified" HAWT or VAWT System

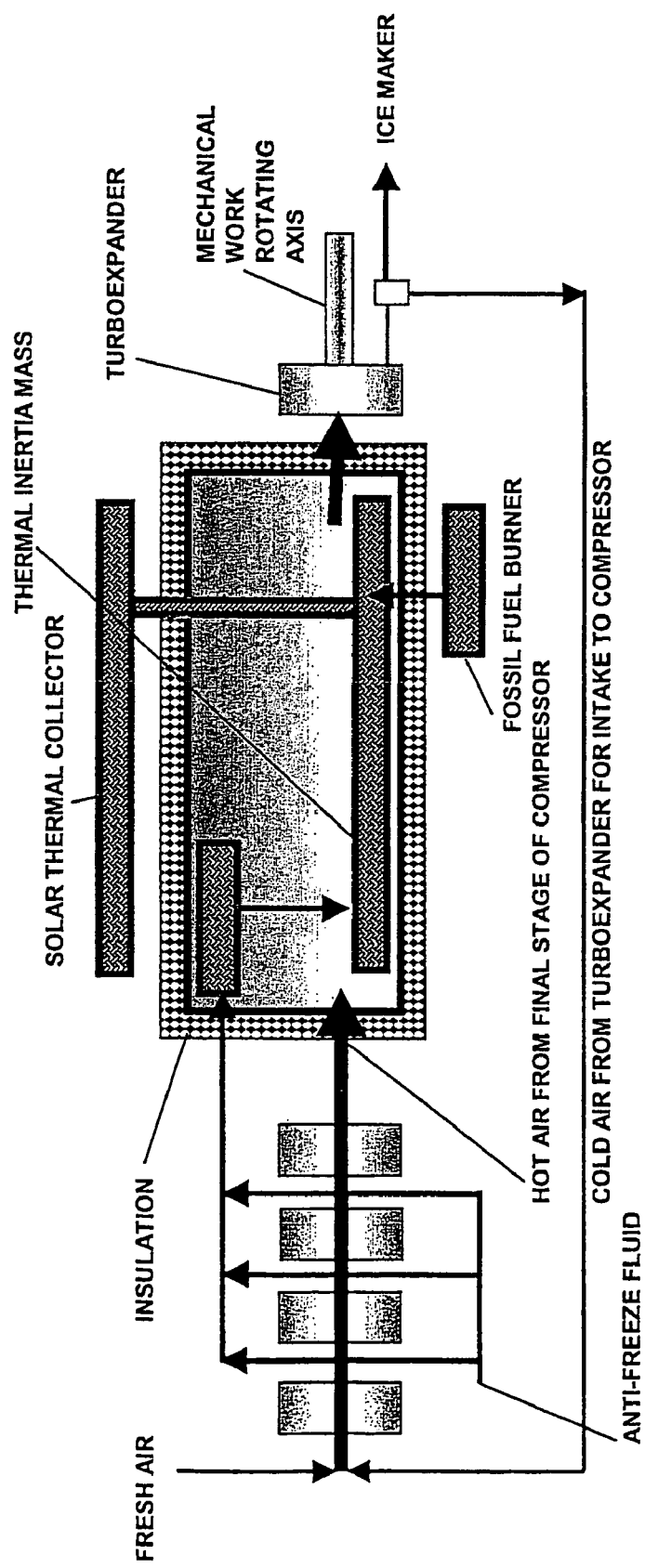
Figure 3. Details of Storage Tank Components

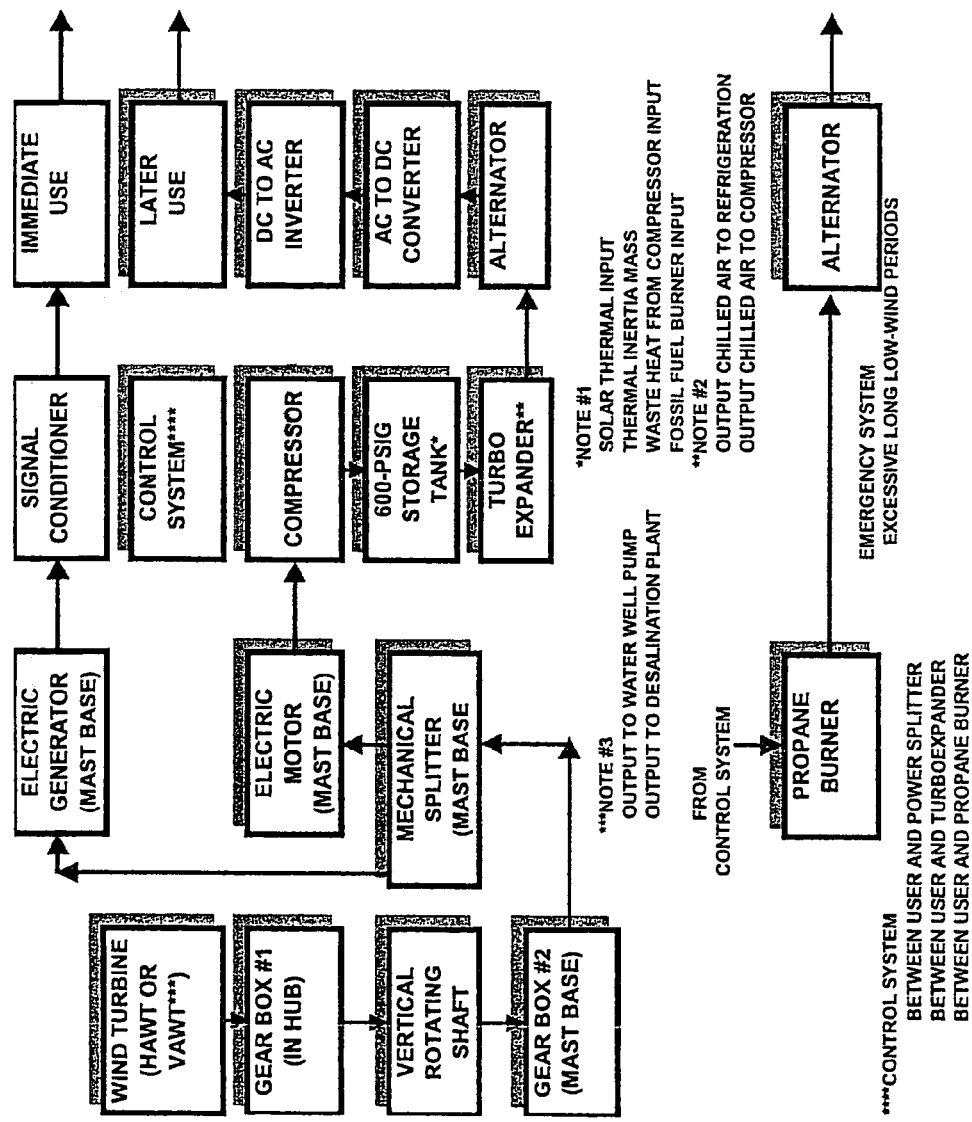
Figure 4. Hybrid Wind Turbine System

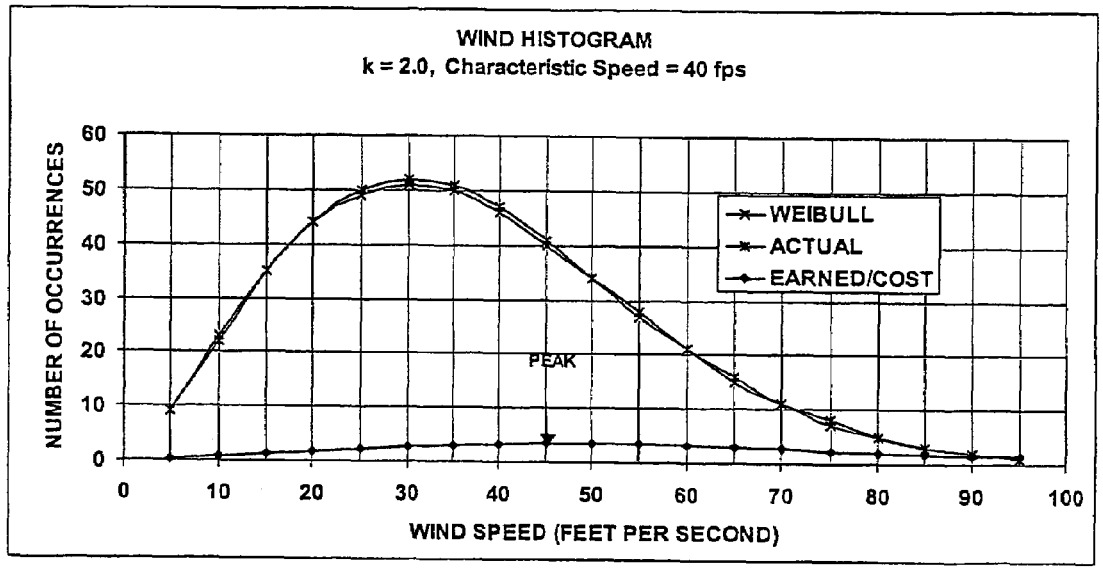
Figure 5. Wind Histogram for CASES A
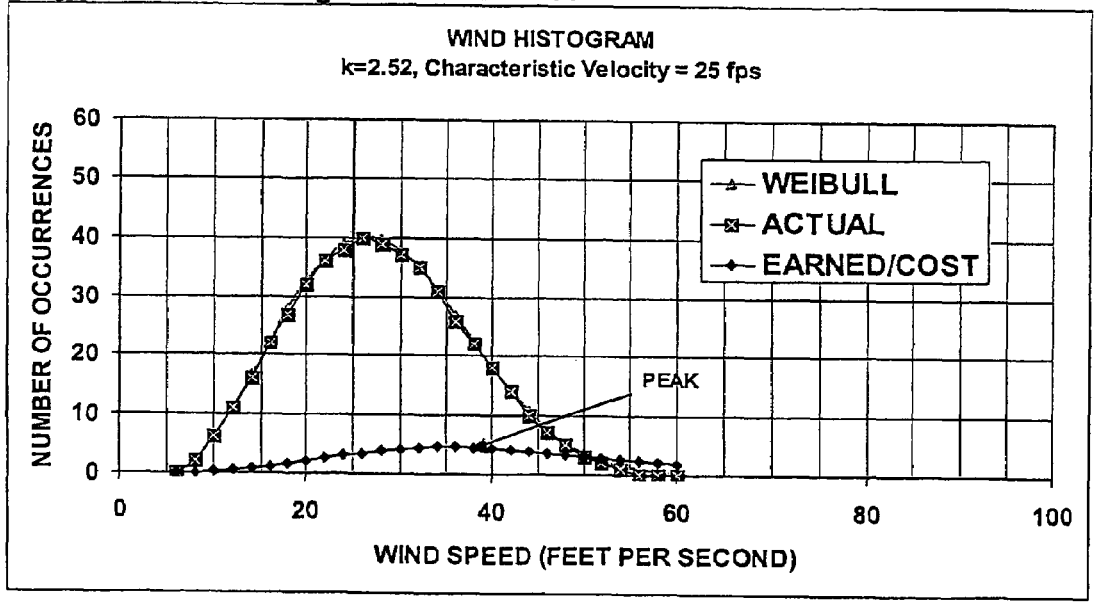
Figure 6. Wind Histogram for CASES B

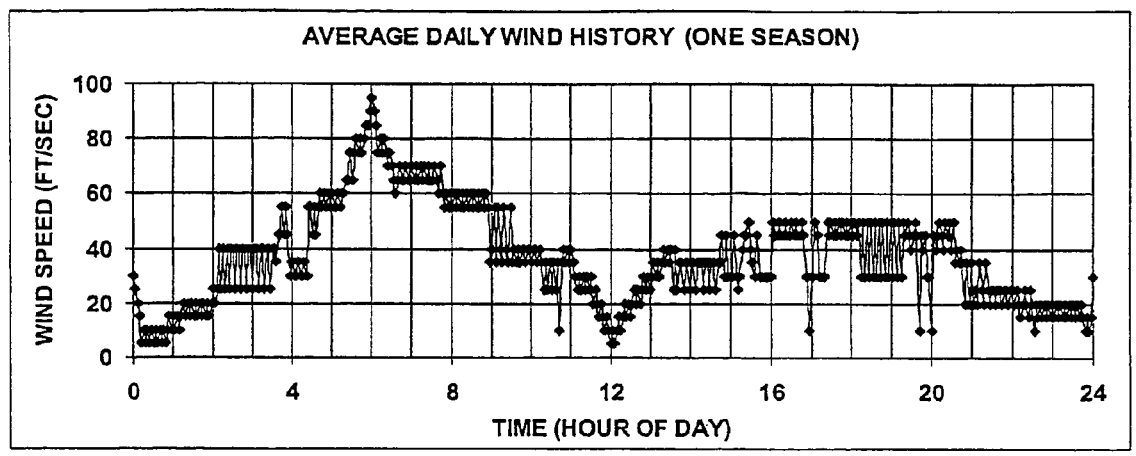
Figure 7. Example Wind History for Windy Site during One Season (CASE A)
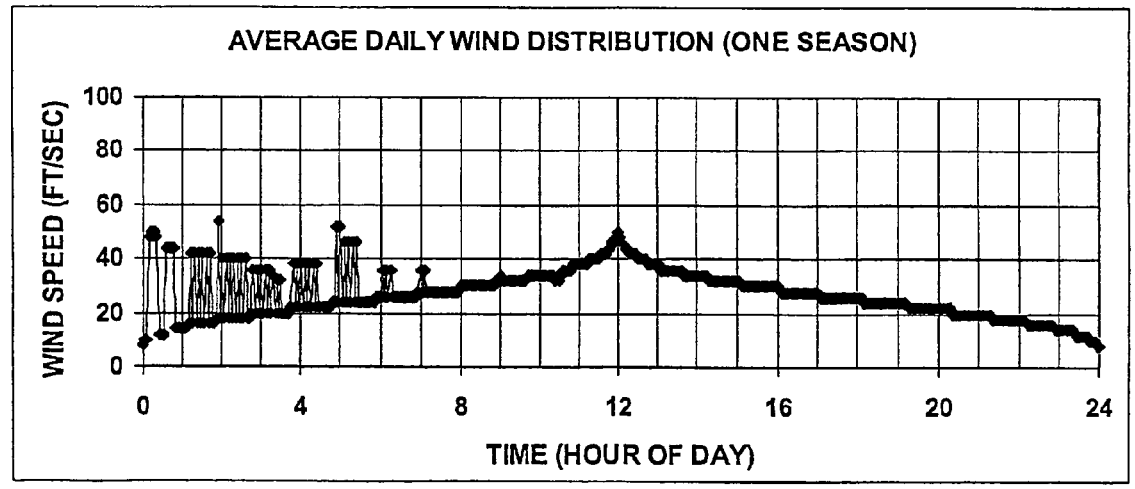
Figure 8. Example Wind History for Less-Windy Site during One Season (CASE B)

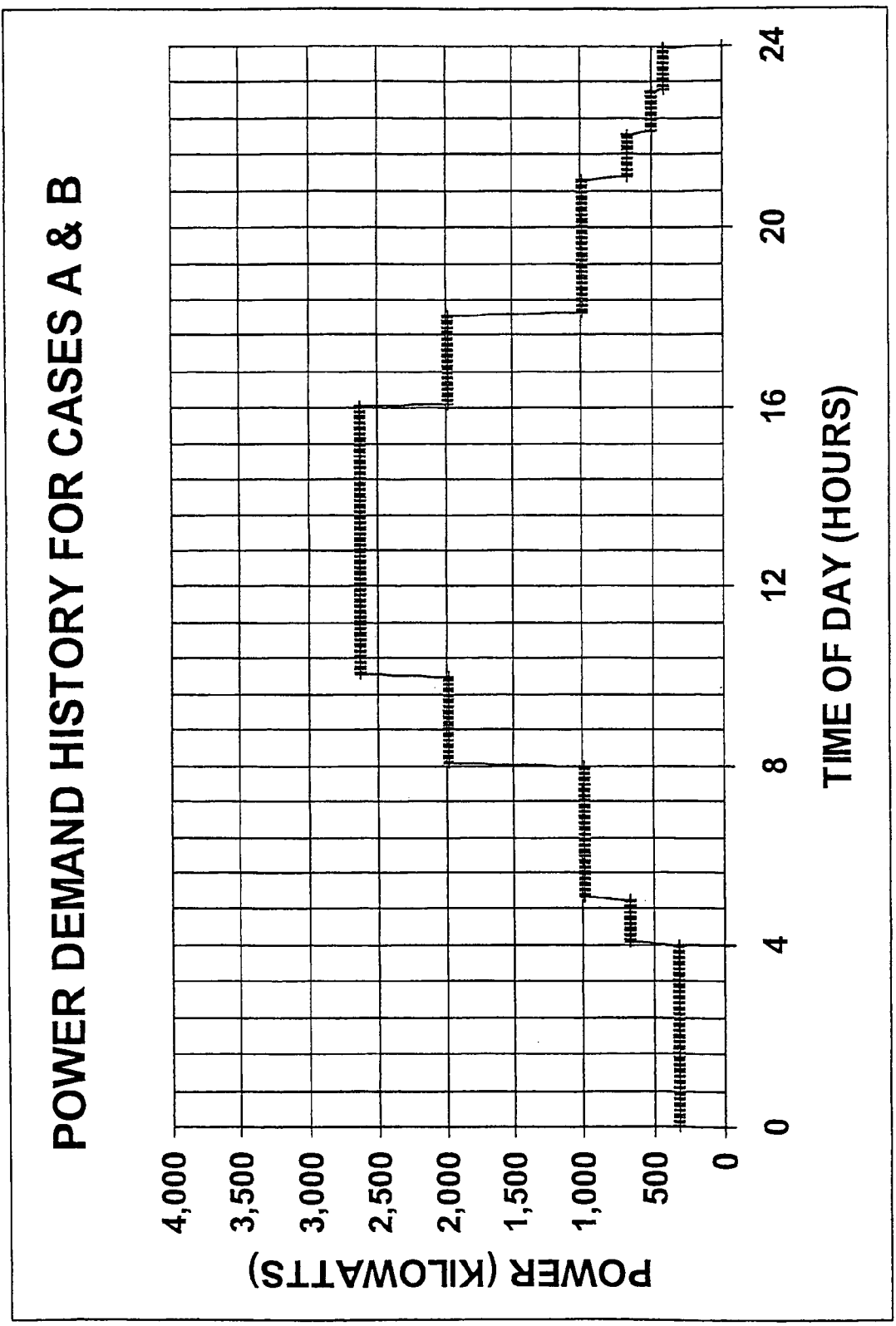
Figure 9. Power Demand History for both CASES A & B

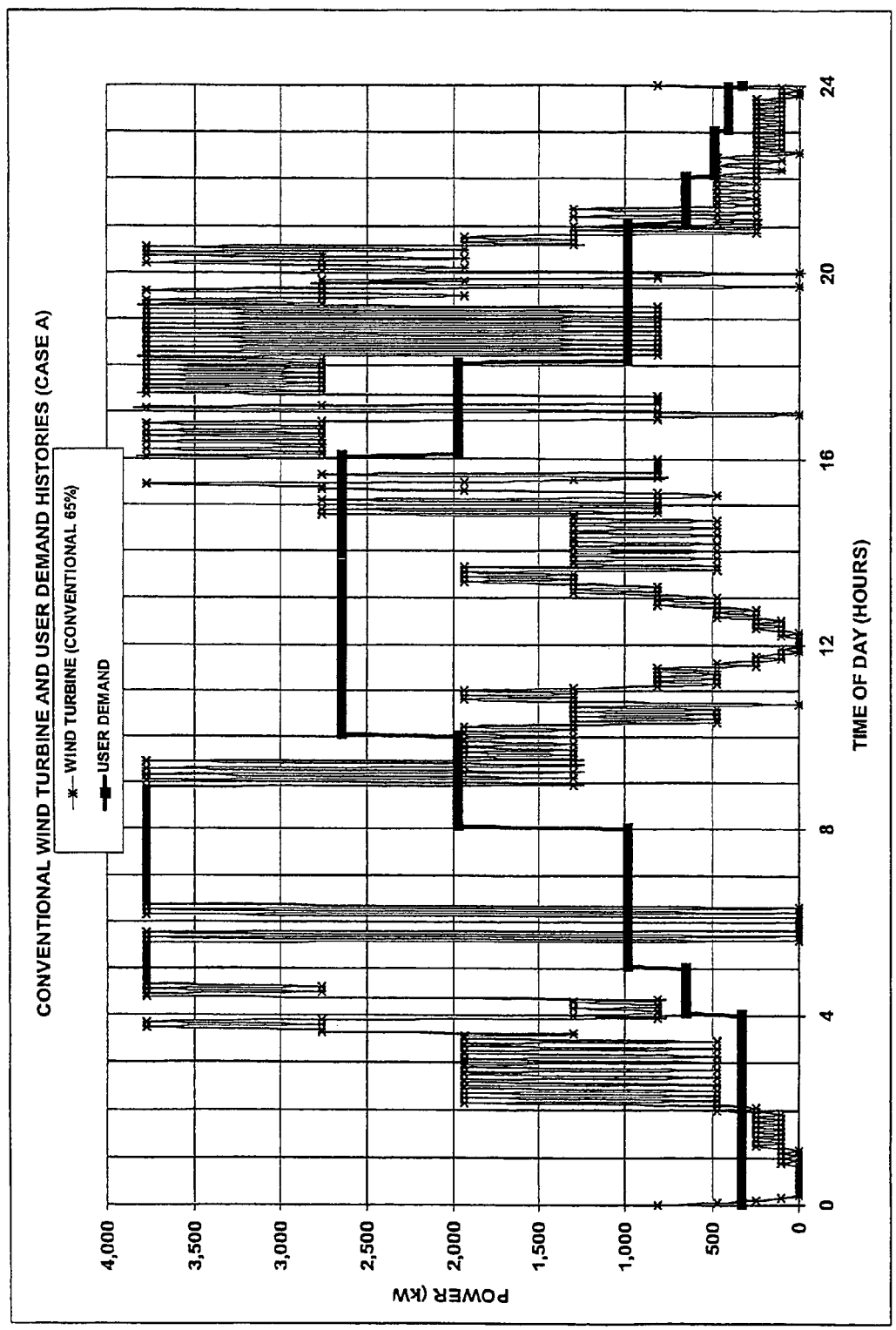
Figure 10. "Conventional" Wind Turbine Power Transmitted Directly to User (CASE A)

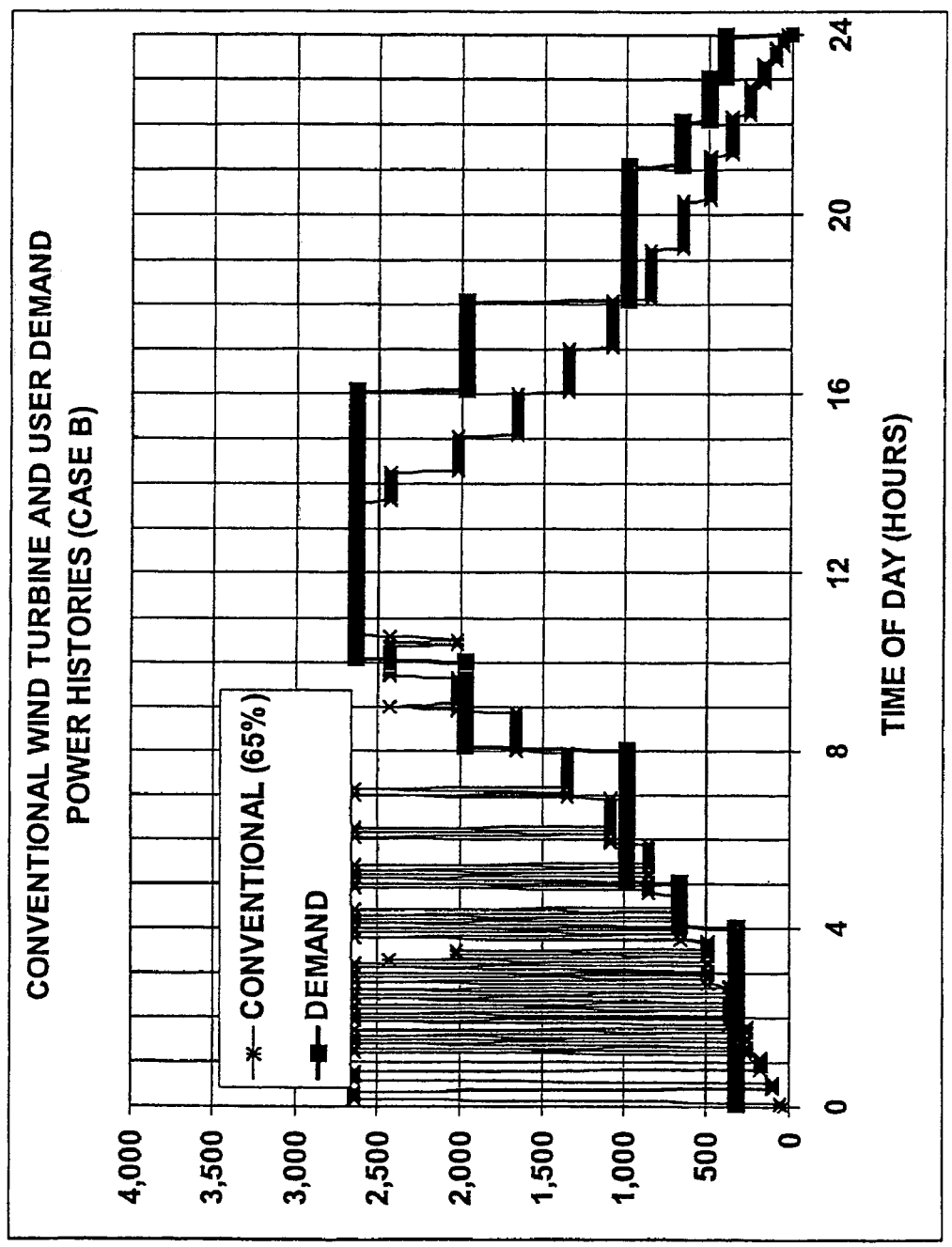
Figure 11 "Conventional" Wind Turbine Power Transmitted Directly to User, (CASE B)

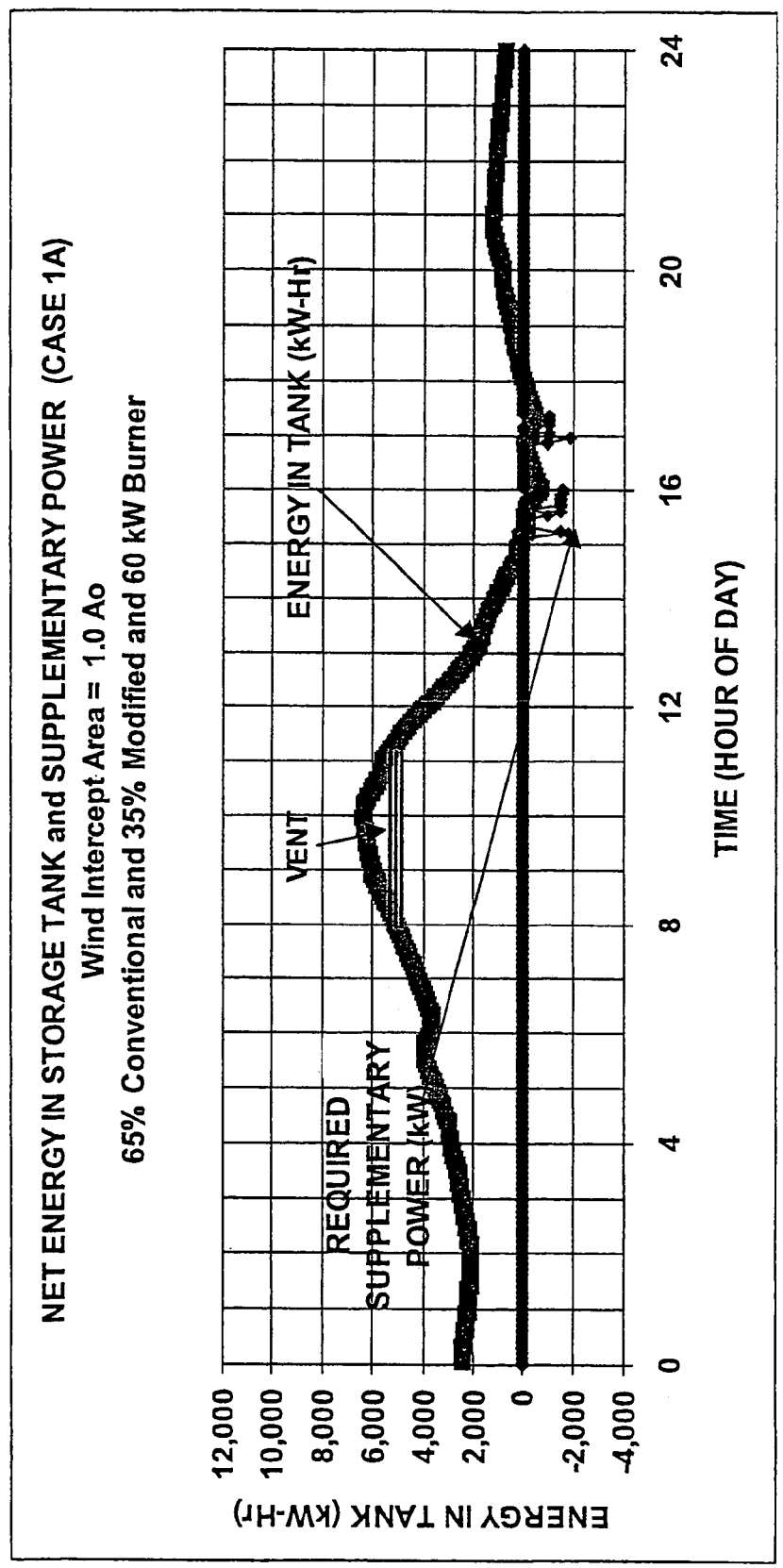
Figure 12. 65% Conventional Wind Turbine Systems and 35% Modified Wind Turbine Systems, A = 1.0 Ao

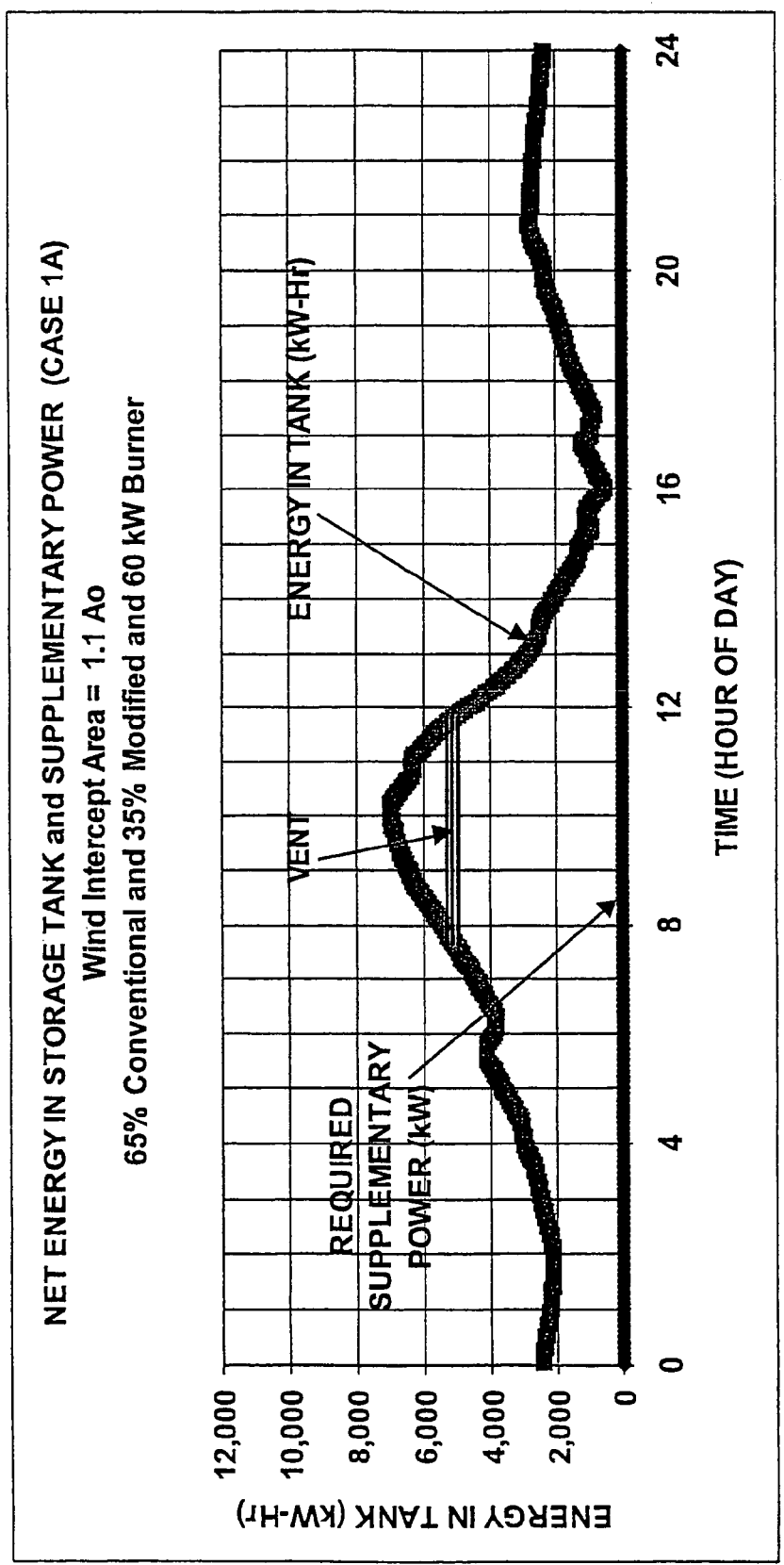
Figure 13. 65% Conventional Wind Turbine Systems and 35% Modified Wind Turbine Systems, A = 1.1 Ao

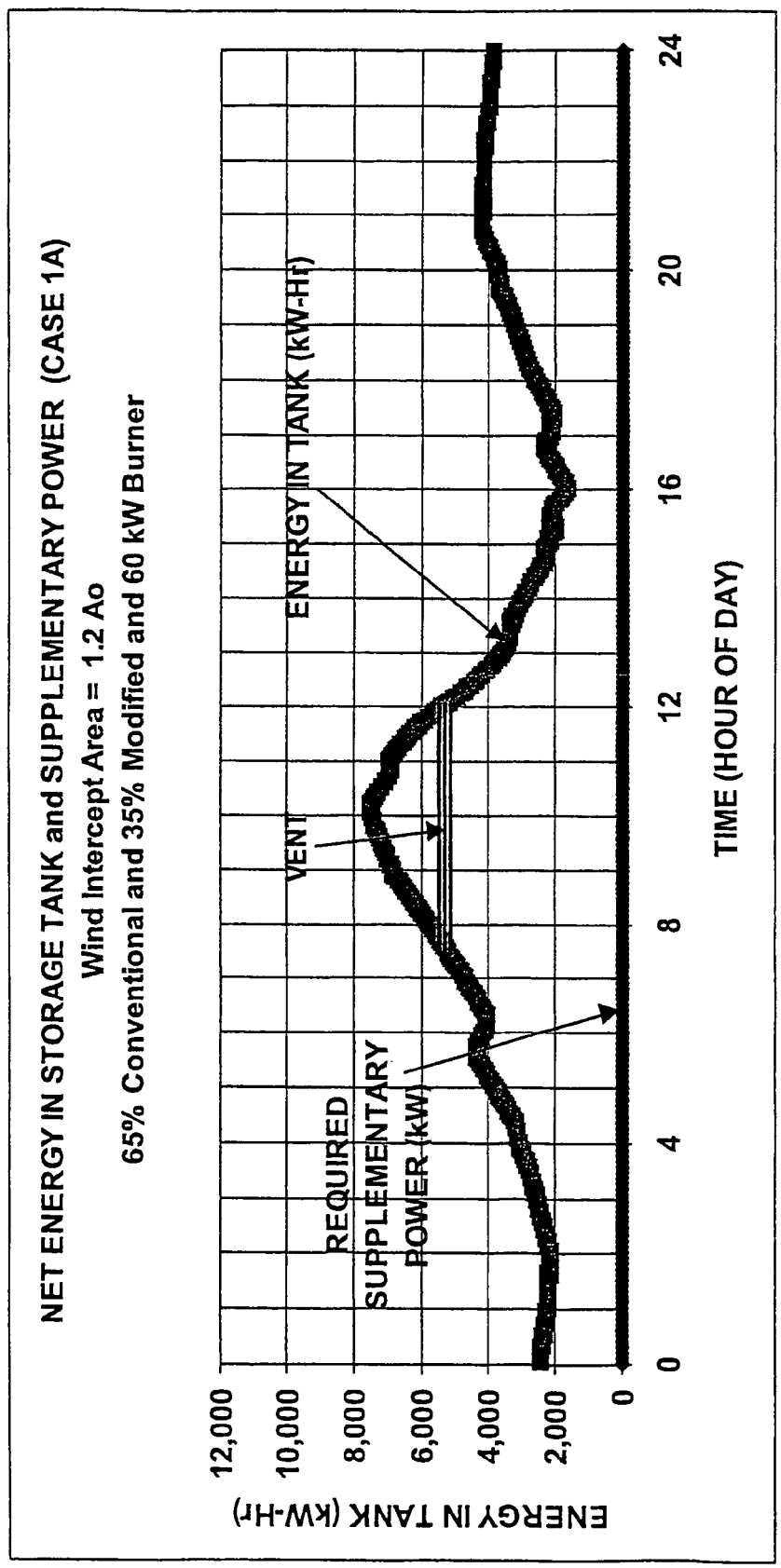
Figure 14. 65% Conventional Wind Turbine Systems and 35% Modified Wind Turbine Systems, A = 1.2 Ao

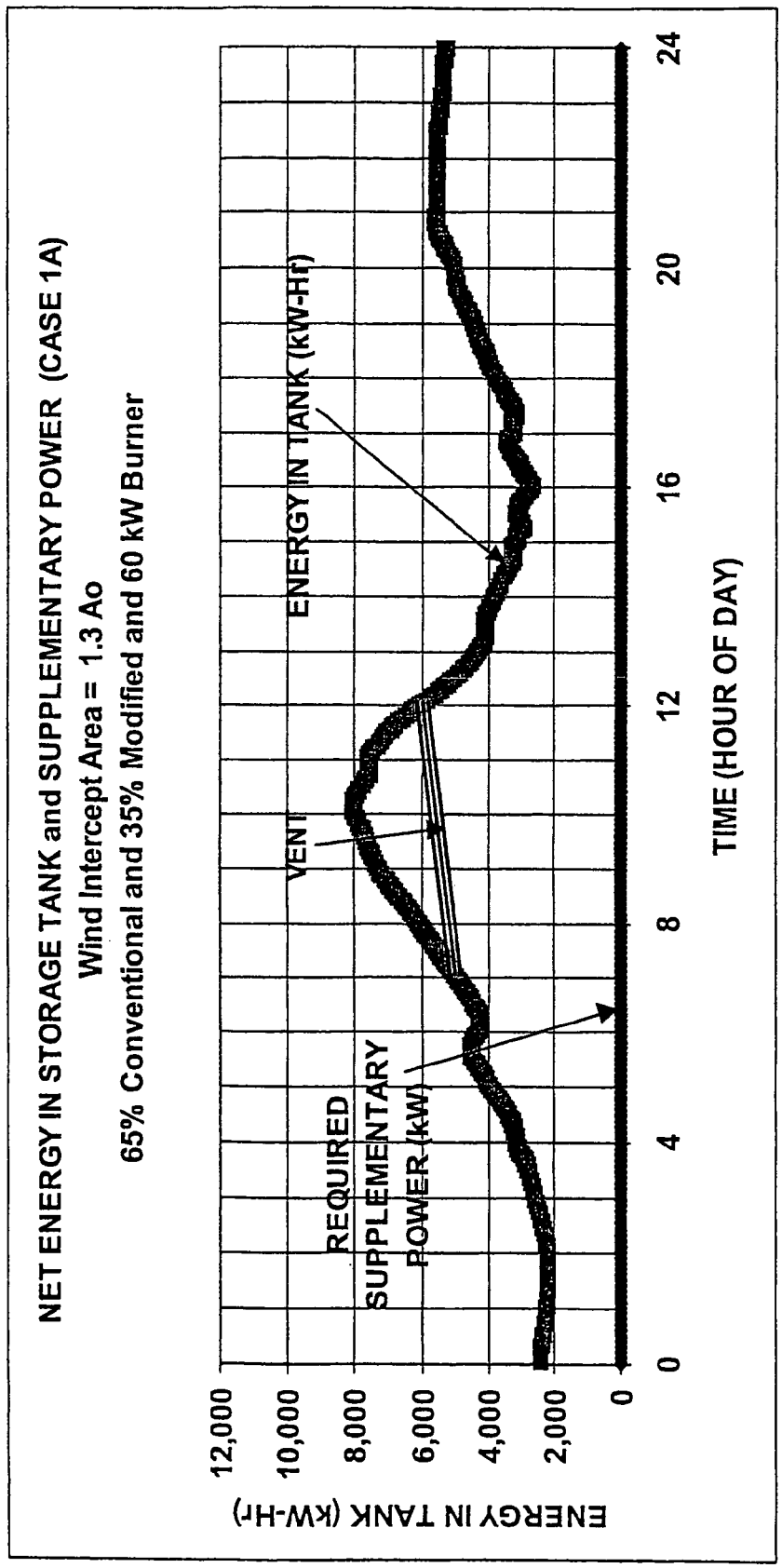
Figure 15. 65% Conventional Wind Turbine Systems and 35% Modified Wind Turbine Systems, A = 1.3 Ao

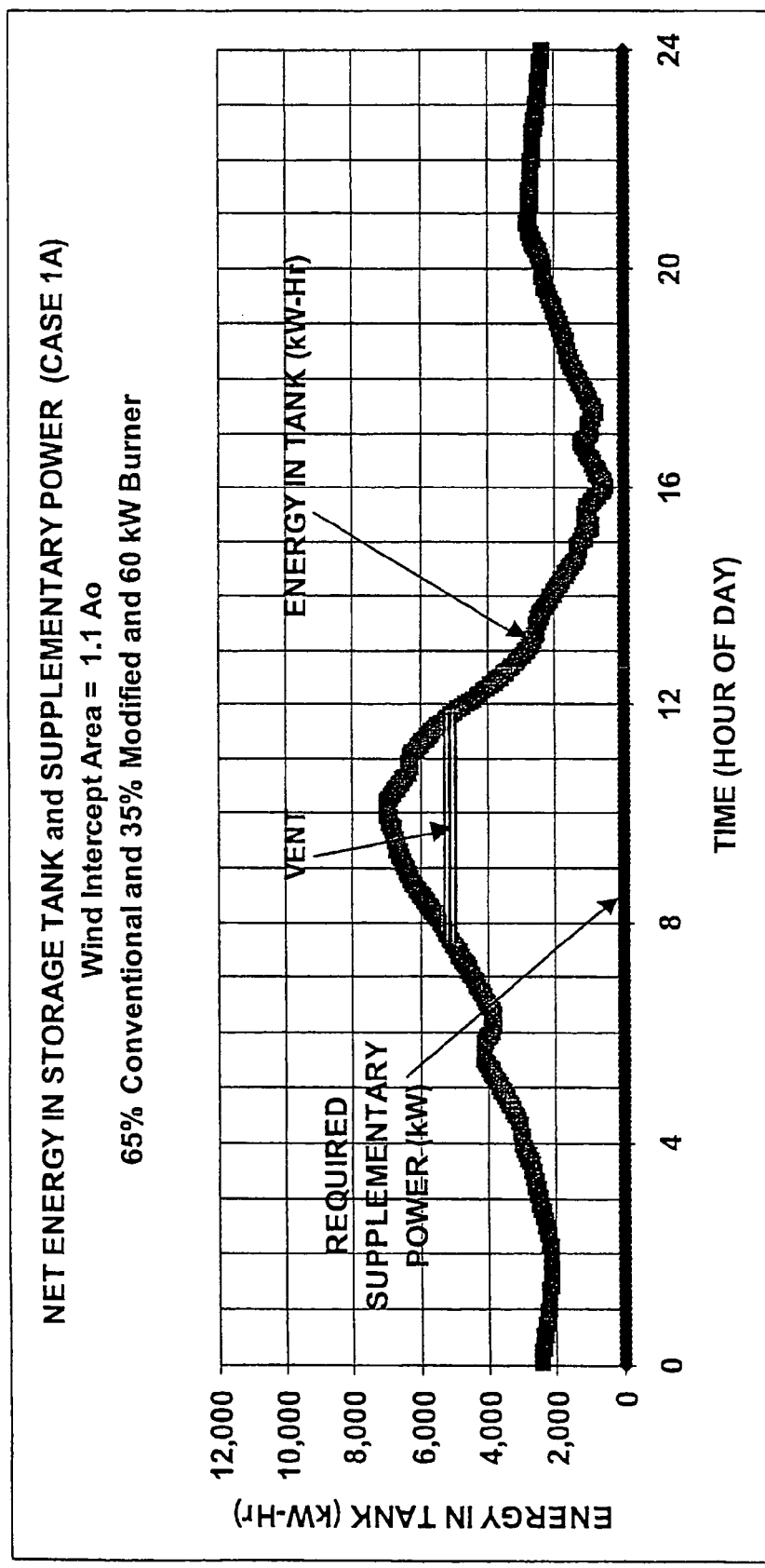
Figure 16. Storage Tank with Solar Power and with 60-kilowatt Burner Power, CASE 1A

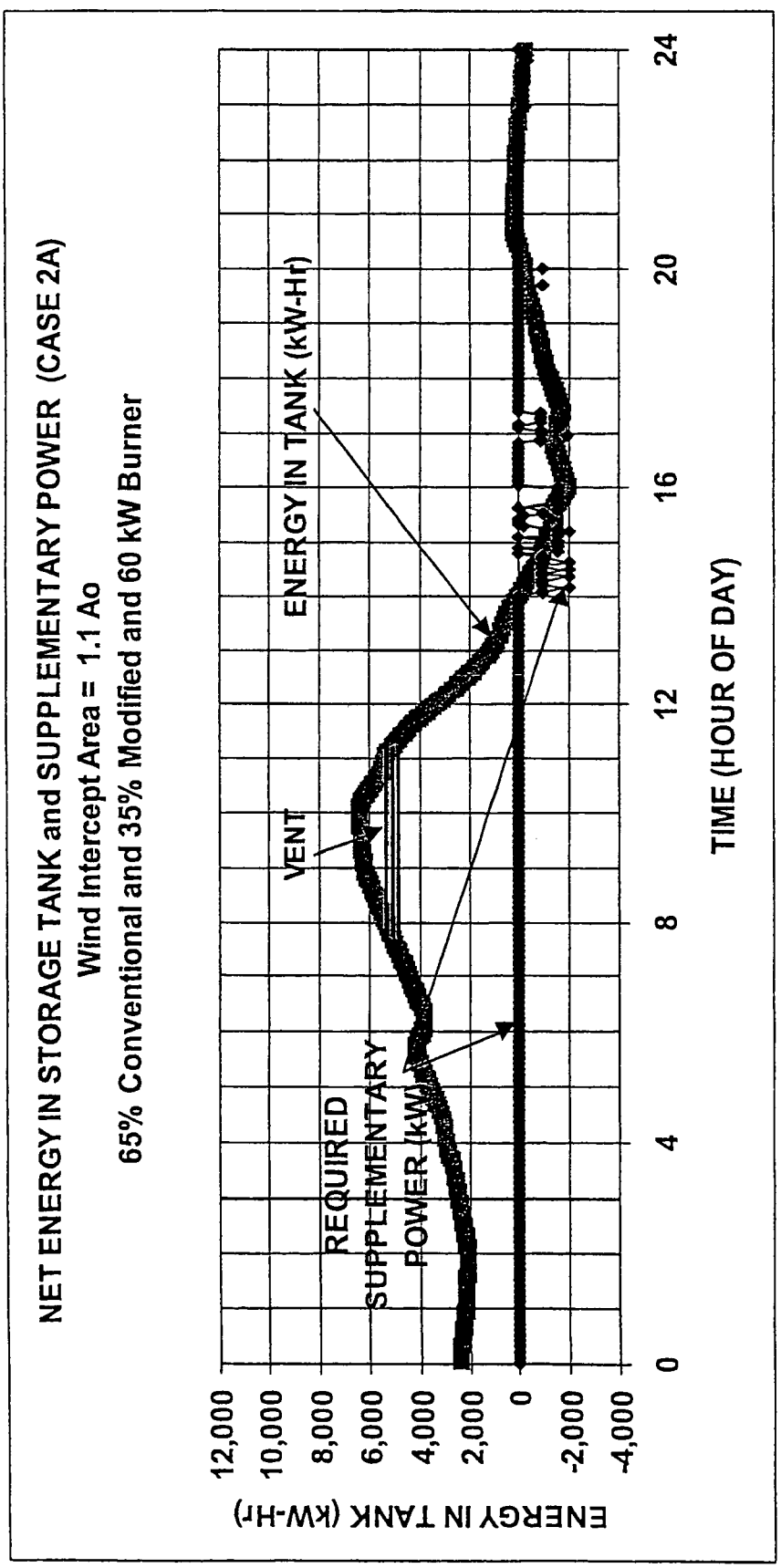
Figure 17. Storage Tank without Solar Power and with 60-kilowatt Burner Power, CASE 2A

METHOD AND APPARATUS FOR USING WIND TURBINES TO GENERATE AND SUPPLY UNINTERRUPTED POWER TO LOCATIONS REMOTE FROM THE POWER GRID

RELATED APPLICATIONS

This application claims priority from U.S. patent application Ser. No. 11/134,801, filed on May 20, 2005, which claims priority from U.S. patent application Ser. No. 10/263,848, filed on Oct. 4, 2002, which claims priority from U.S. Provisional Application Ser. Nos. 60/327,012, filed on Oct. 5, 2001, and 60/408,876, filed on Sep. 9, 2002, all of which are incorporated herein by reference in their entirety.

BACKGROUND OF THE INVENTION

Generation of energy from natural sources, such as sun and wind, has been an important objective in this country over the last several decades. Attempts to reduce reliance on oil, such as from foreign sources, have become an important national issue. Energy experts fear that some of these resources, including oil, gas and coal, may someday run out. Because of these concerns, many projects have been initiated in an attempt to harness energy derived from what are called natural "alternative" sources.

While solar power may be the most widely known natural source, there is also the potential for harnessing tremendous energy from the wind. Wind farms, for example, have been built in many areas of the country where the wind naturally blows. In many of these applications, a large number of windmills are built and "aimed" toward the wind. As the wind blows against the windmills, rotational power is created and then used to drive generators, which in turn, can generate electricity. This energy is often used to supplement energy produced by utility power plants.

One drawback to using wind as an energy source, however, is that the wind does not always blow, and even if it does, it does not always blow at the same speed, i.e., it is not always reliable. The wind also does not blow consistently throughout different times of the day, week, month and seasons of the year, i.e., it is not always predictable. While attempts have been made in the past to store energy produced by wind so that it can be used during peak demand periods, and when little or no wind is blowing, these past systems have failed to be implemented in a reliable and consistent manner. Past attempts have not been able to reduce the inefficiencies and difficulties inherent in using wind as a source for energy on a continuous and uninterrupted basis.

Most populated areas of the country have adequate electrical power generating and back-up systems, such as those provided by local utility companies, and distributed by large electrical power grids. Except for those few instances where a power outage might occur, i.e., due to a line break or mechanical equipment failure, etc., most people in this country have come to expect their electrical power to always be available.

In some remote areas of the country, however, electrical power is not always readily available, and efforts must be made to obtain the needed power. People that live high up in the mountains, or in areas that are remote from the nearest electrical power grid, for example, often have difficulty obtaining power. The cost of running overhead or underground cables from the nearest electrical power grid to service these types of remote locations can be prohibitively high, and, to make matters worse, these costs must often be incurred by the users, i.e., where the land is privately owned, and public utility companies have no obligation to service those locations. Moreover, even if power lines are connected to these distant locations, the power that travels through the lines can be diminished by the time it reaches its destination.

Notwithstanding these problems, because wind is a significant natural resource that will never run out, and is often in abundance in these remote locations, there is a desire to try to develop a system that can not only harness the power generated by wind to provide electrical power, but to do so in a coordinated manner, to enable wind energy to be supplied to remote locations on a continuous and uninterrupted basis, i.e., as a primary energy source, using means for storing the wind energy in an effective manner so that it can be used during peak demand periods, and when little or no wind is available.

SUMMARY OF THE INVENTION

The present invention relates to wind powered energy generating and storing systems capable of being adapted for continuous and uninterrupted use, i.e., as a primary source of electrical energy, such as in locations remote from the electrical power grid. The invention generally comprises a system designed to enable a portion of the power derived from the wind to be dedicated to immediate use, and a portion of the power derived from the wind to be dedicated to energy storage, using an efficiently designed compressed air energy system.

As described above, because the wind is generally unreliable and sometimes unpredictable, it is desirable to be able to store some of the wind energy so that it can be used during peak demand periods, and/or when little or no wind is available. The present invention overcomes the inefficiencies of past wind driven energy use and storage systems by providing a system that can be coordinated in a manner that runs efficiently and continuously, with little or no reliance on conventional sources of energy, and therefore, capable of being used as a primary energy source in locations remote from the electrical power grid.

In one embodiment, the system preferably comprises a large number of windmill stations, wherein a portion of the stations is dedicated to generating energy for immediate use (hereinafter referred to as "immediate use stations"), and a portion of the stations is dedicated to energy storage using a compressed air energy system (hereinafter referred to as "energy storage stations"). The system is preferably designed with a predetermined number and ratio of each type of windmill station to enable the system to be both economical and energy efficient. This embodiment is preferably used in small villages or communities where there may be a need for a large number of windmill stations, i.e., a wind farm.

In this embodiment, each immediate use station preferably has a horizontally oriented wind turbine and an electrical generator located in the nacelle of the windmill, such that the rotational movement caused by the wind is directly converted to electrical energy via the generator. This can be done, for example, by directly connecting the electrical generator to the rotational shaft of the wind turbine so that the mechanical power derived from the wind can directly drive the generator. By locating the generator downstream of the gearbox on the windmill shaft, and by using the mechanical power of the windmill directly, energy losses typically attributed to other types of arrangements can be avoided.

Energy derived from the wind can be converted to electrical power more efficiently when the conversion is direct, e.g., the efficiency of wind generated energy systems can be enhanced by directly harnessing the mechanical rotational movement caused by the wind as it blows onto the windmill blades to directly generate electricity, without having to store the energy first.

Likewise, in this embodiment, each energy storage station is preferably connected to a compressor in a manner that converts wind power directly to compressed air energy. In this respect, the horizontally oriented wind turbine preferably has a horizontal shaft connected to a first gear box, which is connected to a vertical shaft extending down the windmill tower, which in turn, is connected to a second gear box connected to another horizontal shaft located on the ground. The lower horizontal shaft is then connected to the compressor, such that the mechanical power derived from the wind can be converted directly to compressed air energy and stored in high-pressure storage tanks.

The compressed air from each energy storage station is preferably channeled into one or more high-pressure storage tanks where the compressed air can be stored. Storage of compressed air allows the energy derived from the wind to be stored for an extended period of time. By storing energy in this fashion, the compressed air can be released and expanded, such as by turbo expanders, at the appropriate time, such as when little or no wind is available, and/or during peak demand periods. The released and expanded air can then drive an electrical generator, such that energy derived from the wind can be used to generate electrical power on an "as needed" basis, i.e., when the power is actually needed, which may or may not coincide with when the wind actually blows.

The present invention also contemplates that efficiency enhancing features can be incorporated into the storage tanks. For example, the present invention preferably incorporates one or more heating devices that can be provided on top and inside the storage tanks. These can help generate additional heat and pressure energy, help absorb heat for later use, and help to provide a means by which the expanding air can be prevented from freezing. The present invention contemplates using a combination of solar heat, waste heat from the compressor, and low level fossil fuel power, to provide the necessary heat to increase the temperature and pressure of the compressed air in the storage tank.

The heat from the solar thermal power, waste heat power and fossil fuel power is preferably distributed to the storage tanks via a fluid run through thin walled tubing extending through the storage tanks. Other conventional means of supplying heat, such as using combustors, etc., are also contemplated. The present system contemplates that the cold air created by the expansion of the compressed air exhausting from the turbo expander can also be used for additional refrigeration purposes, i.e., such as during the summer where air conditioning services might be in demand.

In another embodiment, the present system preferably comprises a single large windmill station, such as would be used for a home or small farm, wherein the power from the wind can be split or simultaneously dedicated to energy for immediate use and energy storage (hereinafter referred to as a "hybrid station"). In such case, the present invention preferably converts mechanical power directly from the windmill shaft to generate electrical power for immediate use, and, at the same time, can drive a compressor that supplies compressed air energy into one or more storage tanks. The ratio between the amount of energy that is dedicated for immediate use and that dedicated for storage can be changed by making certain adjustments, i.e., such as using clutches and gears located on the station, so that the appropriate amount of energy of each kind can be provided.

For example, at any given time, the gears can be set so that less energy is generated for immediate use than for energy storage, which can be advantageous when energy demand is low and wind availability is high. On the other hand, the hybrid station can also be adjusted so that the ratio is the opposite, i.e., more energy for immediate use is generated than for energy storage, which can be advantageous in situations where energy demand is high and wind availability is moderate. This enables the hybrid station to be customized to a given application, to allow the system to provide the appropriate amount of power for immediate use and energy storage, depending on wind availability and energy demand.

In another embodiment, the hybrid station can be used in conjunction with the immediate use and energy storage stations discussed above to enable large wind farms to be designed in a more flexible and customized manner, e.g., so that the overall system can be customized to a given application with particular needs and characteristics. That is, using a combination of the three types of windmill stations can enable a system to be more specifically adapted to the needs and variations in wind availability and energy demand for a given area.

The wind patterns in any given area of the country can change from time to time, i.e., from one season to another, from one month to another, or even from day to day, or hour to hour. At the same time, the energy demand patterns for a given location may stay relatively constant from time to time, or may change, but not, in most cases, in a manner coincident with the wind availability changes. That is, there are likely to be many times during a given year where there is a complete mismatch between wind power availability and power demand, i.e., such as where demand is high when supply is low, and where supply is high when demand is low. In this respect, the present invention contemplates that these issues be taken into account when designing the applicable wind farm system, wherein an appropriate number of each type of windmill station can be installed so that the energy to be supplied and converted to electrical power can be provided on a continuous and uninterrupted basis, notwithstanding any mismatch between supply and demand.

The present invention contemplates that selecting an appropriate number of windmill stations of each type will involve a study of wind availability patterns throughout the year, at a given wind farm site, as well as the energy demand patterns and cycles that are present at the site. It is contemplated that the worst case scenarios, e.g., the worst seasons or months when supply and demand are mismatched the most, should be considered in selecting the design for the system, since for the system to work properly, it must, at a minimum, be designed to provide a continuous supply of energy during the worst mismatched periods.

Using the hybrid stations in combination with the immediate use and energy storage stations makes it possible to enable a portion of the stations to switch from one type to the other, i.e., from immediate use to energy storage, and vice verse, and vary the ratio between them. This can be helpful in situations where the worst-case scenario only occurs a few months out of the year, while during the rest of the year, the wind availability and energy demand periods may follow a much less mismatched pattern. In such case, the overall system may otherwise be designed in a manner that may end up being significantly over-designed for the rest of the year.

The present invention contemplates that the system can be configured to maximize the amount of energy that can be derived from wind energy, by taking into account when and how much wind is available at any given time, and when and how much energy is in demand at any given time, so that the system can be coordinated and operated efficiently and reliably to provide continuous and uninterrupted power to locations remote from the power grid. While it is often difficult to predict when and how much the wind will blow, and the extent of the demand periods, the present invention seeks to use reliable data as a means of calculating certain averages, i.e., relating to the wind supply and energy demand, and using those averages as a means of using an iterative process to create an optimum system that can be applied to virtually any given application for the entire year.

Some of the efficiency factors that are preferably taken into account relate to the overall cost of constructing the system, wherein it is desirable to use the supply and demand averages to come up with the optimum number of windmill stations that have to be installed to meet the energy demands placed on the system at any given time of the year. This would involve determining how many stations should be dedicated to immediate use and energy storage, and how many hybrid stations are needed, to ensure that the system can run efficiently and effectively throughout the year.

BRIEF DESCRIPTION OF THE DRAWINGS

FIG. 1 shows a flow-chart of a horizontal axis wind turbine system dedicated to generating energy for immediate use;

FIG. 2 shows a flow-chart of a modified horizontal axis wind turbine system dedicated to storing energy in a compressed air energy system;

FIG. 3 shows a schematic diagram of the storage tank and heater components of the system shown in FIG. 2;

FIG. 4 shows a flow-chart of a hybrid horizontal axis wind turbine system for generating electricity for immediate use and energy storage simultaneously;

FIG. 5 shows a wind histogram for a hypothetical location during the windy season;

FIG. 6 shows a wind histogram for a hypothetical location during the less windy season;

FIG. 7 shows a wind history chart for the same hypothetical location for an average day during the windy season;

FIG. 8 shows a wind history chart for the same hypothetical location for an average day during the less windy season;

FIG. 9 shows an energy demand history chart for the same hypothetical location showing the energy demand for both the windy and less windy days.

FIG. 10 shows a chart comparing the energy demand curve and the wind power availability curve for the same hypothetical location during the windy season;

FIG. 11 shows a chart comparing the energy demand curve and the wind power availability curve for the same hypothetical location during the less windy season;

FIG. 12 shows a chart indicating the amount of standby energy remaining in a hypothetical storage tank for a typical day during the windy season using the present system with the waveform mismatch factor being about 3.0;

FIG. 13 shows a chart indicating the amount of standby energy remaining in a hypothetical storage tank for the same day during the windy season using the present system with the waveform mismatch factor being about 3.3;

FIG. 14 shows a chart indicating the amount of standby energy remaining in a hypothetical storage tank for the same day during the windy season using the present system with the waveform mismatch factor being about 3.6;

FIG. 15 shows a chart indicating the amount of standby energy remaining in a hypothetical storage tank for the same day during the windy season using the present system with the waveform mismatch factor being about 3.9;

FIG. 16 shows a chart indicating the amount of standby energy remaining in a hypothetical storage tank for the same day during the windy season shown in FIG. 13 where the present system has both solar and auxiliary burner heating devices; and FIG. 17 shows a chart indicating the amount of standby energy remaining in a hypothetical storage tank for the same day during the windy season shown in FIG. 16 where the present system has no solar heating device, but does have an auxiliary burner device.

DETAILED DESCRIPTION OF THE INVENTION

The present invention relates to improvements in generating and storing wind energy. The invention comprises several improved methods and apparatuses that are designed to increase the efficiencies and adaptabilities of wind generated energy use and storage systems, to provide a continuous and uninterrupted supply of electrical energy to a location remote from an electrical power grid. The present system is preferably designed to enable users with no access to an existing power grid to be able to rely almost exclusively on wind power to supply energy on a continuous and uninterrupted basis, despite unreliable and generally unpredictable wind conditions.

The apparatus portion of the present invention preferably comprises three different types of windmill stations, including a first type having a horizontal axis wind turbine that converts rotational mechanical power to electrical energy using an electrical generator and providing energy for immediate use (hereinafter referred to as "immediate use stations"), a second type having a horizontal axis wind turbine that converts mechanical rotational power to compressed air energy for energy storage (hereinafter referred to as "energy storage stations"), and a third type that combines the characteristics of the first two in a single windmill station having the ability to convert mechanical rotational power to electrical energy for immediate use and/or energy storage (hereinafter referred to as "hybrid stations"). The present system is designed to use and coordinate one or more of the three types of windmill stations described above so that a portion of the wind derived energy can be dedicated to energy for immediate use and a portion of the energy can be dedicated for energy storage. The present invention also contemplates that an independent supplementary low power emergency power supply could be provided to assure an uninterrupted power supply.

The following discussion describes each of the three types of windmill stations discussed above, followed by a description of how best to coordinate the windmill stations for any given application:

A. Immediate Use Stations:

FIG. 1 shows a schematic flow diagram of an immediate use station. The diagram shows how mechanical rotational power generated by a windmill is converted to electrical power and supplied as electrical energy for immediate use.

Like conventional windmill devices used for creating electrical energy, the present invention contemplates that each immediate use station will comprise a windmill tower with a horizontal axis wind turbine located thereon. The tower is preferably erected to position the wind turbine at a predetermined height, and each wind turbine is preferably "aimed" toward the wind to maximize the wind intercept area, as well as the wind power conversion efficiency of the station. A wind turbine, such as those made by various standard manufacturers, can be installed at the top of the tower, with the windmill blades or fans positioned about a horizontally oriented rotational shaft.

In this embodiment, a gearbox and an electrical generator are preferably located in the nacelle of the windmill such that the mechanical rotational power of the shaft can directly drive the generator to produce electrical energy. By locating the electrical generator directly on the shaft via a gearbox, mechanical power can be more efficiently converted to electrical power. The electrical energy can then be transmitted down the tower via a power line, which can be connected to other lines or cables that feed power from the immediate use station to the user.

The present invention contemplates that the immediate use stations are to be used in connection with other windmill stations that are capable of storing wind energy for later use as described in more detail below. This is because, as discussed above, the wind is generally unreliable and unpredictable, and therefore, having only immediate use stations to supply energy for immediate use will not allow the system to be used on a continuous and uninterrupted basis such as when little or no wind is available. Accordingly, the present invention contemplates that in wind farm applications where multiple windmill stations are installed, additional energy storage stations would also have to be installed and used.

B. Energy Storage Stations.

FIG. 2 shows a schematic flow chart of an energy storage windmill station. This station also preferably comprises a conventional windmill tower and horizontal axis wind turbine as discussed above in connection with the immediate use stations. Likewise, the wind turbine is preferably located at the top of the windmill tower and capable of being aimed toward the wind as in the previous design. A rotational shaft is also extended from the wind turbine for conveying power.

Unlike the previous design, however, in this embodiment, energy derived from the wind is preferably extracted at the base of the windmill tower for energy storage purposes. As shown in FIG. 2, a first gearbox is preferably located adjacent the wind turbine in the nacelle of the windmill, which can transfer the rotational movement of the horizontal drive shaft to a vertical shaft extending down the windmill tower. At the base of the tower, there is preferably a second gearbox designed to transfer the rotational movement of the vertical shaft to another horizontal shaft located on the ground, which is then connected to a compressor. The mechanical rotational power from the wind turbine on top of the tower can, therefore, be transferred down the tower, and can be converted directly to compressed air energy, via the compressor located at the base of the tower. A mechanical motor in the compressor forces compressed air energy into one or more high pressure storage tanks located on the ground nearby.

With this arrangement, each energy storage station is able to convert mechanical wind power directly to compressed air energy, which can be stored for later use, such as during peak demand periods, and/or when little or no wind is available. Because energy storage stations only provide energy for storage, the present system preferably contains one or more immediate use stations, which are generally more efficient in converting mechanical to electrical power, as discussed above, along with one or more energy storage stations.

The energy storage portion of the present system preferably comprises means for storing and making use of the compressed air energy in the storage tank. In this respect, the high-pressure storage tanks are preferably designed to withstand the pressures likely to be applied by the compressors, and insulated to maintain existing temperatures in the tank. The tanks are also preferably located in proximity to the energy storage stations (to which they are connected) such that compressed air can be conveyed to the tanks without significant pressure losses.

Although the present invention contemplates that various size tanks can be used, the present system preferably contemplates that the size of the tanks should be based on calculations relating to a number of factors. For example, as will be discussed, the size of the storage tanks can depend on the number and ratio of energy storage and immediate use stations that are installed, as well as other factors, such as the size and capacity of the selected wind turbines, the capacity of the selected compressors, the availability of wind, the extent of the energy demand, etc. The preferred tank size used in the examples of the present discussion is based on a preferred capacity of 600 psig. The storage tanks are preferably made in units of 10 feet in diameter and 60 feet long to accommodate road or rail transport.

The present invention contemplates that any of the many conventional means of converting the compressed air into electrical energy can be used. In the preferred embodiment, one or more turbo expanders are used to release the compressed air from the storage tanks to create a high velocity airflow that can be used to power a generator to create electrical energy. This electricity can then be used to supplement the energy supplied by the immediate use stations. Whenever stored wind energy is needed, the system is designed to allow air in the storage tanks to be released through the turbo expanders. As shown in FIG. 2, the turbo expanders preferably feed energy to an alternator, which is connected to an AC to DC converter, followed by a DC to AC inverter and then followed by a conditioner to match impedances to the user circuits.

FIG. 3 shows details of the storage tank components to which the energy storage stations are connected. In the preferred embodiment, one or more means for generating and providing heat to the compressed air stored in the tanks is preferably provided. The present invention contemplates using at least three different types of heating systems as a means of providing heat to the compressed air inside the high pressure tanks, including 1) solar thermal collectors to utilize energy from the sun, 2) waste heat collectors to circulate the waste heat generated by the compressor to the storage tanks, and 3) a separate heating unit, such as a fossil fuel burner, to introduce heat into the storage tanks. The invention also contemplates using other standard methods of providing heat to the compressed air.

The means by which heat from the various collectors are distributed to the compressed air in the tanks generally comprises a large surface area of thin walled tubing that extend through the tanks. The tubing preferably comprises approximately 1% of the total area inside the tanks, and preferably comprises copper or carbon steel material. They also preferably contain an antifreeze fluid that can be heated by the collectors and distributed by the tubing throughout the inside of the storage tank. The thin walled tubing acts as a heat exchanger, which is part of the thermal inertia system.

The storage tanks are preferably lined by insulation to prevent heat loss from inside.

The increased temperature inside the storage tank provides several advantages. First, it has been found that heat contributes greatly to the efficiency of overall work performed by the turbo expanders, and therefore, by increasing the temperature of the compressed air in the storage tanks, a greater amount of energy can be generated from the same size storage tanks. Second, by increasing the temperature of the air in the storage tank, the pressure inside the tank can be increased, wherein a greater velocity can be generated through the turbo expander. Third, heating the air in the tank helps to avoid freezing that can otherwise be caused by the expansion of the air in the tank. Without a heating element, the temperature of the air released from the tank can reach near cryogenic levels, wherein water vapor and carbon dioxide gas within the tank can freeze and reduce the efficiency of the system. The present invention is preferably able to maintain the temperature of the expanding air at an acceptable level, to help maintain the operating efficiency of the system. Additional types of heating units, such as combustors, etc., can also be provided if desired.

Furthermore, the present invention preferably takes advantage of the cold air being generated by the turbo expander. For example, the cold air can be rerouted through pipes to the compressor to keep the compressor cool. Moreover, waste chilled air from the turbo expander can be used for refrigeration and air conditioning purposes, such as during warm or hot weather.

The system also preferably comprises a control system to control the operation of the storage tank, compressor, turbo expander, heating units, refrigeration components, etc. The control system is preferably designed to be able to maintain the level of compressed air energy in the tank at an appropriate level, by regulating the flow of compressed air into and out of the storage tank. The controls are also used to control and operate the heat exchangers that are used to help control the temperature of the air in the tank. The controls determine which heat exchangers are to be used at any given time, and how much heat they should provide to the compressed air in the storage tanks. The control system preferably has a microprocessor that is pre-programmed so that the system can be run automatically. Because a separate electric power generator is provided to enable energy to be generated during those periods where there is an excessively long period of low wind or no wind situations, the control system preferably enables the user to determine when to use the compressed air energy and when to use the electric power generator.

The present invention contemplates that an overall system comprising both immediate use and energy storage stations can be developed and installed. In such case, depending on the demands placed on the system by the area of intended use, a predetermined number of immediate use stations, and a predetermined number of energy storage stations, are preferably provided. This enables the present system to be adapted to be customized and used in connection with various size applications. In large applications, for example, a multiple number of windmill stations can be installed and coordinated, as well as apportioned between immediate use and energy storage, to provide the desired results.

C. Hybrid Stations:

FIG. 4 shows a hybrid station. The hybrid station is essentially a single windmill station that comprises certain elements of the immediate use and energy storage stations, with a mechanical power splitting mechanism that allows the wind power to be apportioned between power for immediate use and energy for storage, depending on the needs of the system.

Like the two stations discussed above, a conventional windmill tower is preferably erected with a conventional horizontal axis wind turbine located thereon. The wind turbine preferably comprises a horizontal rotational shaft having the ability to convey mechanical power directly to the converters.

Like the energy storage station, the hybrid station is adapted so that wind energy can be extracted at the base of the windmill tower. As schematically shown in FIG. 4, the wind turbine has a rotational drive shaft connected to a first gearbox located in the nacelle of the windmill, wherein horizontal rotational movement of the shaft can be transferred to a vertical shaft extending down the tower. At the base of the tower, there is preferably a second gearbox designed to transfer the rotational movement of the vertical shaft to another horizontal shaft located at the base.

At this point, as shown in FIG. 4, a mechanical power splitter is preferably provided. The splitter, which will be described in more detail below, is designed to split the mechanical rotational power of the lower horizontal shaft, so that an appropriate amount of wind power can be transmitted to the desired downstream converter, i.e., it can be adjusted to send power to an electrical generator for immediate use, and/or a compressor for energy storage.

Downstream from the mechanical splitter, the hybrid station preferably has, on one hand, a mechanical connection to an electrical generator, and, on the other hand, a mechanical connection to a compressor. When the mechanical splitter is switched fully to the electrical generator, the mechanical rotational power from the lower horizontal shaft is transmitted directly to the generator via a geared shaft. This enables the generator to efficiently and directly convert mechanical power to electrical energy, and for the electrical power to be transmitted to the user for immediate use.

On the other hand, when the mechanical splitter is switched fully to the compressor, the mechanical rotational power from the lower horizontal shaft is transmitted directly to a compressor, to enable compressed air energy to be stored in a high-pressure storage tank. This portion of the hybrid station is preferably substantially similar to the components of the energy storage station, insofar as the mechanical power generated by the hybrid station is intended to be directly converted to compressed air energy, and stored in high-pressure tanks, wherein the energy can be released at the appropriate time, via one or more turbo expanders. Like the previous embodiment, a high-pressure storage tank is preferably located in close proximity to the windmill station so that compressed air energy can be efficiently stored in the tank for later use.

In one version of the hybrid station, only a single windmill station is used for a given area. This would be true in cases where the energy is provided for a single home or small farm. In such case, a single high-pressure storage tank is preferably connected to the compressor and used to store energy in the energy storage mode.

On the other hand, as will be discussed, hybrid stations can also be incorporated into a large wind farm application, and installed along with the other stations for immediate use and also for energy storage. In such case, the compressor on each hybrid station can be connected to centrally located storage tanks, such that a plurality of stations can feed compressed air into a single tank. In fact, the system can be designed so that both the hybrid stations and the energy storage stations can feed compressed air energy into a storage tank, or several tanks, as the case may be.

The details of the storage tank components shown in FIG. 3 are preferably incorporated into the hybrid station. For example, any one or more of the three types of heating systems described above can be used to heat air in the storage tank, to provide the heating advantages thereof. The storage tank can also be adapted with heat exchangers for distributing the heat within the tank, i.e., through thin walled tubing that run through the inside of the tank. An additional propane burner can also be provided.

The mechanical power splitter, which is adapted to split the mechanical power between power dedicated for immediate use and for energy storage, preferably comprises multiple gears and clutches so that mechanical energy can be conveyed directly to the converters and split either completely, or so that they both operate simultaneously.

In the preferred embodiment, the mechanical splitter comprises a large gear attached to the lower horizontal drive shaft extending from the bottom of the station, in combination with additional drive gears capable of engaging and meshing with the large gear. A first clutch preferably controls the drive gears and enables them to move from a first position that engages and meshes with the large gear, and a second position that causes the drive gear not to engage and mesh with the large gear. This way, by operation of the first clutch, an appropriate number of drive gears can be made to engage and mesh with the large gear, depending on the desired distribution of mechanical power from the lower drive shaft to the two types of converters.

For example, in one embodiment, there can be one large gear and five additional drive gears, and the system can contemplate that the first clutch can be used to enable the large gear to engage and mesh with, at any one time, one, two, three, four or five of the drive gears. In this manner, the first clutch can control how many of the drive gears are to be activated and therefore be driven by the lower horizontal drive shaft, to determine the ratio of mechanical power being conveyed to the appropriate energy converting component of the system. That is, if all five drive gears are engaged with the large gear, each of the five drive gears will be capable of conveying one-fifth or 20% of the overall mechanical power to the energy converters. At the same time, if only three of the additional drive gears are engaged with the large gear, then one-third or 33.33% of the mechanical power generated by the windmill will be conveyed to the energy converters. If two drive gears engage the large gear, each will convey one half of the transmitted power.

The mechanical splitter of the present invention also contemplates that a second clutch be provided to enable each of the additional drive gears to be connected downstream to either the electrical generator (which generates energy for immediate use) or the air compressor (which generates compressed air energy for energy storage). By adjusting the second clutch, therefore, the mechanical power conveyed from the large gear to any one of the additional drive gears can be directed to either the electrical generator or the compressor.

This enables the amount of mechanical power supplied by the windmill station to be distributed and apportioned between immediate use and energy storage on an adjustable basis. That is, the amount of power distributed to each type of energy converter can be made dependent on how many additional drive gears engage the large gear, and to which energy converter each engaged drive gear is connected, e.g., those connected to the electrical generator will generate energy for immediate use, and those connected to the compressor will generate energy for storage.

Based on the above, it can be seen that by adjusting the clutches and gears of the present mechanical power splitter mechanism, the extent to which energy is dedicated for immediate use and energy storage can be adjusted and apportioned. For example, if it is desired that 40% of the mechanical power be distributed to energy for immediate use, and 60% of the mechanical power be distributed to energy for storage, the first clutch can be used to cause all five of the additional drive gears to be engaged with the large gear, while at the same time, the second clutch can be used to cause two of the five engaged drive gears (each providing 20% of the power or 40% total) to be connected to the electrical generator, and three of the five engaged drive gears (each providing 20% of the power or 60% total) to be connected to the compressor. This way, the mechanical splitter can divide and distribute the mechanical power between immediate use and energy storage at a predetermined ratio of 40/60, respectively.

In another example, using the same system, if it is desired that the mechanical power be distributed one-third to immediate use and two-thirds to energy storage, the first clutch can be used to cause only three of the additional drive gears to be engaged with the large gear, and the second clutch can be used to cause one of the engaged drive gears to be connected to the electrical generator, and the other two engaged drive gears to be connected to the compressor. This way, the mechanical power supplied by the wind turbine can be distributed at a ratio of one-third to two-thirds, i.e., between energy for immediate use and energy storage, respectively.

The present system contemplates that any number of additional drive gears can be provided to vary the extent to which the mechanical power can be split. It is contemplated, however, that having five additional drive gears would likely provide enough flexibility to enable the hybrid station to be workable in most situations. With five additional drive gears, the following ratios can be provided: 50/50, 33.33/66.66, 66.66/33.33, 20/80, 40/60, 60/40, 80/20, 100/0, and 0/100.

By using the clutches on the mechanical power splitter, the hybrid station can be adjusted at different times of the year to supply a different ratio of power between immediate use and energy storage. As will be discussed, depending upon the power demand and wind availability histories, it is contemplated that different ratios may be necessary to provide an adequate amount of power to the user, particularly in situations where energy demand requirements remain consistent on a continuous and uninterrupted basis, despite unreliable and unpredictable wind patterns.

Moreover, when the hybrid stations are used in conjunction with a large wind farm, the mechanical splitter can be used to completely switch the mechanical power between immediate use and energy storage, i.e., it can be set to provide 100% energy for immediate use, or 100% energy for storage, depending on the needs of the system. This can be done by having only one of the additional drive gears engage and mesh with the large gear, using the first clutch, and having that drive gear connected to the appropriate converter, using the second clutch. As will be discussed, this enables the present system to be designed and installed on a cost and energy efficient basis.

D. Coordination of the Three Types of Stations:

The next discussion relates to the steps that are preferably taken to determine how best to coordinate the above types of windmill stations for a particular application, including determining whether a particular location is even suitable for having the present system installed and operated. Such a determination generally comprises a cost verses benefit analysis, and energy efficiency study, that take into account the availability of wind at any given time and location, i.e., over the course of a year, and the demands that are likely to be placed on the system at that location.

FIGS. 5 and 6 show what are commonly called wind histograms for a hypothetical location. These charts represent hypothetical examples of possible wind histories that could take place in an actual location, as a means of showing how the present system can be coordinated and applied to varied circumstances. In this particular example, although there are normally four seasons that have to be considered, only two charts (for two of the four seasons) are provided for demonstration purposes. These two seasons, in this example, represent the two extreme cases for the hypothetical year in question. In an actual study, charts for all four seasons, or all periods of the year, would normally be taken into account.

In general, these charts show the average number of times the wind reaches a certain velocity (when measured at three minute intervals) during any given day, over the course of a three-month period, i.e., a full season. The wind histories are designed to enable a study to be made of the average amount of wind that might be available at any given location, during any given day, from one season of the year to another.

For example, FIG. 5 is intended to represent the average number of wind velocity occurrences during the "windy" season, and FIG. 6 is intended to represent the average number of wind velocity occurrences at the same location during the "less windy" season. In either case, it is intended that multiple charts be produced for a study of any given location, i.e., daily for each season or study period, to help indicate the average number of wind speed occurrences that might occur during any given day, during various times of the year. This information can be useful, as will be discussed, in helping to formulate a solution for the entire year, which can be based on the best and worst case scenarios presented by the studies.

FIG. 5 shows that during the windy season the peak number of occurrences for any particular wind velocity measurement during a 24-hour period was about 52, which occurred when the wind velocity reached about 30 feet per second. Stated differently, during an average day of the windy season, the wind blew at about 30 feet per second more often than it blew at any other speed, i.e., for a time estimated to equal about two and one-half hours (52 occurrences multiplied by 3 minute intervals equals 156 minutes). Another way to look at this is that the wind was blowing an average of about 30 feet per second during an average of about 52 of the 480 measurements taken during the day.

The chart in FIG. 5 also shows that the wind speed was below 10 feet per second for about 23 occurrences on the average during the windy season, which means that it was below that speed for about an estimated one hour and ten minutes (i.e., 23 occurrences multiplied by 3 minute intervals equals 69 minutes). Likewise, the chart shows that the wind speed was above 75 feet per second for an average of about 8 occurrences, which means that it was above that speed for about an estimated 24 minutes (i.e., 8 occurrences multiplied by 3 minute intervals equals 24 minutes).

What this means is that depending on what kind of wind turbines are selected, the charts can predict the amount of time that the wind turbines would be operational and functional on an average day to produce energy. For example, if it is assumed that the wind turbines that are selected are designed to operate only when the wind speed is between 10 feet per second and 75 feet per second, due to efficiency and safety reasons, it can be predicted that during any given day during the windy season those wind turbines would only be non-operational for an average of about an hour and a half (i.e., 69 minutes plus 24 minutes equals 93 minutes), and operational for an average of about twenty-two and a half hours.

The extent to which the wind turbines would be operational to produce power during the above mentioned twenty-two and a half hour period will then depend on the wind speed at any given time during the day. In general, the wind power to be derived by a wind turbine is assumed to follow the equation:

$$P=C_1*0.5*Rho*A*U^3$$

Where
$C_1$=Constant (which is obtained by matching the calculated power with the
dimensions of the wind turbine area and wind speed performance)
Rho=Density of air
A=Area swept by wind turbine rotors
U=Wind Speed This means that the amount of wind power generated by the wind is proportional to the cube of the wind speed. Accordingly, in a situation where the wind turbines are fully operational within the velocity range between 10 feet per second and 75 feet per second, the total amount of wind power that can be generated during the day will be a direct function of the total wind speed between those ranges.

On the other hand, various wind turbines are designed so that the wind power output remains a constant during certain high wind velocity ranges. This can result from the windmill blades becoming feathered at speeds above a certain maximum. For example, certain wind turbines may function in a manner where within a certain velocity range, i.e., between 50 and 75 feet per second, the wind power generated remains a constant despite changes in wind speed. In such case, the wind power produced by the windmill will remain equal to the wind power generated at the lowest speed within that range, i.e., at 50 feet per second. Accordingly, in the above example, during a period where the wind speed is between 50 feet per second and 75 feet per second, the amount of wind power generated by the wind turbine is equal to the power generated when the wind speed is 50 feet per second. Moreover, many wind turbines are designed so that when the wind speed exceeds a maximum limit, such as 75 feet per second, the wind turbines will shut down completely to prevent damage due to excess wind speeds. Accordingly, the total amount of energy that can be generated by a particular windmill must take these factors into consideration.

FIG. 6 shows that during the less windy season the peak number of occurrences for any particular wind velocity measurement during a 24-hour period was about 40, which occurred when the wind velocity reached about 26 feet per second. Stated differently, during the less windy season, the wind blew at about 26 feet per second more often than it blew at any other speed, i.e., for a total amount of time estimated to equal about two hours (40 occurrences multiplied by 3 minute intervals equals 120 minutes). Another way to look at this is that the wind was blowing at about 26 feet per second during an average of about 40 of the 480 measurements taken during the day.

The chart in FIG. 6 also shows that the wind speed was below 10 feet per second for only about 5 occurrences on an average day, which means that it was below that speed for an average estimated to be about 15 minutes (i.e., 5 occurrences multiplied by 3 minute intervals equals 15 minutes). Likewise, the chart shows that the wind speed was never above 75 feet per second (i.e., 0 occurrences multiplied by 3 minute intervals equals 0 minutes).

In this case, using the same wind turbines described above, it can be predicted that, during any given day of the less windy season, the wind turbines would not operate for an average of about 15 minutes per day, and would operate for an average of twenty-three hours and 45 minutes every day. As discussed above, the charts can predict the amount of time that the wind turbines would be able to function and operate to produce energy during an average day, as well as how much energy they can generate.

One can generally see from the charts that the curve in FIG. 6 is steeper and narrower but lower overall than that shown in FIG. 5. This indicates that the wind speeds during the less windy season aren't quite as high, but are more predictable and constant than they are during the windy season for this particular site. Moreover, because these charts show averages over a period of time, it is necessary to consider that the actual occurrences over the stated period of time can vary considerably. In this respect, it should be noted that the wind histograms for the wind speeds are typically statistically described by the Weibull distribution. Wind turbine manufacturers have used the Weibull Distribution association with the "width parameter" of k=2.0, although there are sites wherein the width parameter has attained a value as high as k=2.52. Thus these two values have been selected for this hypothetical technical performance evaluation. Also, the Weibull Wind Distributions for FIGS. 5 and 6 are characterized by a Shape Factor of 2.00 and 2.52, respectively, a Characteristic Velocity of 40 and 25 ft/sec, respectively, and a Minimum Velocity of 2 and 6 ft/sec, respectively.

While it is desirable to know how often, on the average, certain wind speeds actually occur during the year, it is also important to know when the various wind speeds occur during any given day, i.e., on the average, so that they can be compared to the peak demand periods that also occur during any given day. In this respect, FIGS. 7 and 8 show the daily wind distributions that occur on the average during particular hours of the day, for the particular seasons that they track, i.e., FIG. 7 shows the average of a compilation of measurements taken over a hypothetical windy season, and FIG. 8 shows the average of a compilation of measurements taken over a hypothetical less windy season. In an actual analysis, as will be described, it will be more appropriate to take measurements daily, and produce a separate chart for each day of each season or period, and then use that information to develop a system for the entire year.

FIG. 7 shows that during the windy months the peak wind speed occurred at an average of about 6:30 A.M., while the minimum wind speed typically occurred at an average of about noon. As seen in the wind speed profile, the wind speed typically began to build during the morning hours, reaching a peak at about 6:30 A.M., followed by an almost continuous drop-off to a minimum wind speed at about noon. The wind speed then typically rose to an approximate "steady" average level of about 40 feet per second, with some short fluctuations (turbulence) ranging between about 25 feet per second to 50 feet per second. This condition persisted on the average for about 7 hours, i.e., between about 2:00 P.M. and 9:00 P.M., followed by a drop-off to about 10 feet per second at about midnight. While this curve shows an average for the windy season, a typical chart for a single day during the season will show a similar curve.

FIG. 8, on the other hand, shows that during the less windy months the peak wind speed occurred at an average of about noon, and the minimum wind speed occurred at an average of about midnight. In this case, the morning hours typically appeared to consist of extremely turbulent wind speeds with significant wind speed variations appearing every three minutes. At the same time, this wind speed profile shows a distinct pattern of a steady rise in wind speed till about noon, when the wind speed reached a peak of about 50 feet per second. On the other hand, the average wind speed during the afternoon and evening hours appeared to decline in a relatively smooth and consistent manner, with few variations for the remainder of the day. One significant characteristic that can be noted about this wind speed history is the significant amount of turbulence occurring during the early morning hours, and the lack of turbulence during the rest of the day. Again, while this curve shows an average for the less windy season, a typical chart for a single day will show a similar curve.

These charts show that there are differences in the availability of wind during any given time of an average day, and that they differ between seasons. In an actual analysis, data from all seasons or periods on a daily basis will need to be considered.

Another factor to consider is the energy demand at the given location to be serviced by the present wind energy generation and storage system. This can be done by measuring the amount of energy used per unit of time in the area to be serviced, and charting the measurements as an average for any given day. This is what is represented in FIG. 9, which shows the energy demand curve at the hypothetical location.

For purposes of this example, and for simplicity purposes, the demand curve will be assumed to be the same throughout the windy and less windy seasons, although in actual practice, the curves are likely to be different from one period to the next. In this example, the peak energy demand period is during the middle of the day when air conditioners during the summer and heaters during the winter are likely to be turned up.

FIGS. 10 and 11 show how different or how similar the wind availability and energy demand curves can be for any given location during any given period.

FIG. 10 represents the windy season and incorporates a wind power history curve based on the wind speed history curve of FIG. 7 (by multiplying the wind speed by the above wind power formula) and the energy demand curve of FIG. 9. The wind power curve, in this respect, is similar in shape to the wind speed curve because wind power is proportional to the cube of the wind speed. In this case, a hypothetical constant and wind turbine area size, etc. were assumed, and the two curves were essentially overlapped at random to indicate the differences between the two. In this example, both the peak demand period and the lowest wind availability period occur during the middle of the day, i.e., at about noon. What this shows is that during the middle of the day there is a tremendous difference between energy supply and energy demand which must be taken into account in designing a viable wind energy use and storage system. Indeed, during the middle of the day, when demand is greatest, the wind speed is actually consistently below 10 feet per second, wherein no wind power at all would be available for immediate use or for storage.

FIG. 11 represents the less windy season and incorporates a wind power history curve based on the wind speed history curve of FIG. 8 (by multiplying the wind speed by the above wind power formula) and the energy demand curve of FIG. 9. Again, the wind power curve, in this respect, is similar in shape to the wind speed curve because wind power is proportional to the cube of the wind speed. In this case, a hypothetical constant and wind turbine area size, etc. were assumed, and the two curves were essentially overlapped at random to indicate the differences between the two. In this example, however, unlike the previous one, the shapes of the two curves are much more similar. The peak demand period, which occurs during the middle of the day, substantially coincides with the peak wind availability period, which also occurs in the middle of the day. What this shows is that there is likely to be more of a balance between supply and demand during this time of the year. On the other hand, it can be seen that the overall curve is also smaller during this season, indicating that the overall availability of wind is significantly less during this period The curves shown in FIGS. 10 and 11 help to show the differences that can exist between the supply and demand curves, which can also differ greatly from one season to another. As will be discussed, it will be necessary to compare data from the various seasons or periods to take into account the worst-case scenarios in order to develop a system that will work efficiently year-round. Since it is not practical to install and remove windmills every time the seasons change, the present invention contemplates the selection of a solution that will be cost-effective and energy-efficient, based on the worst case scenarios that might exist at any given location, and then for that solution to be coordinated and modified as necessary year-round.

E. Procedure for Developing a Customized System:

The steps that are preferably taken to design a customized system are as follows:

First, daily information relating to all four seasons of the year is preferably obtained. The gathering of information can be divided up by seasons, or by any other periods, such as monthly, every two months, every six months, etc., depending on how varied the histories are likely to be. When the histories are not highly varied, it may be possible to track longer and less frequent periods, such as six-month periods. When the histories are much more varied, however, it may be more desirable to track shorter periods more frequently, such as every month.

In the beginning, it is desirable to collect information for each day of each season or period for the location in question. For example, if the year is divided into four seasons, or four 90 day periods, it would be desirable to collect information from the desired location regarding each day of that season, such that calculations relating to the location can be repeated 90 times to obtain the necessary data for that season.

Initially, it is important to collect the daily wind histories at the location for each of the chosen seasons or periods. The method preferably involves plotting a daily supply curve, wherein the curve preferably shows the average lowest wind speeds that occur at 0.05-hour (three-minute) intervals during the day. For each day, there will preferably be a 24-hour plot of the average minimum wind speed histories. A statistical Weibull function distribution is then preferably applied to smooth the wind speed occurrences, as discussed above. This increases the minimum wind speed at any given time of day to satisfy the Weibull function, and will result in the "standard" available averaged wind history for the chosen period. The information is preferably plotted on a daily wind histogram similar to those shown in FIGS. 7 and 8. The information obtained from the wind histories is then converted to wind power by multiplying the wind speed data with the applicable wind power formula, wherein the wind power amounts can then be plotted on a curve over a 24-hour period for each day.

Next, the user daily demand power histories for the location to be serviced is preferably plotted. Plotting the demand histories preferably takes into account the information needed to plot a daily demand curve, which preferably shows the average peak power demand at 0.05-hour (three-minute) intervals for each day. For each season or period, an average daily demand history curve is created which preferably tracks the amount of power in kilowatts that would be needed by the serviced area during that day. The example in FIG. 9 shows that during the middle of the average day, there is a peak demand for about 2,640 kilowatts of power. The total amount of energy needed during the day can then be determined using the power demand history curve extended over a 24-hour period, e.g., the integral of the power history over the entire 24-hour period is, in this example, about 33,000 kW-Hr.

Next, the volume of the storage tank is preferably estimated, before making a final determination later, to provide a basis for making certain assumptions. One method that has been found to be useful in estimating the size of the tank is to assume that the volume needed corresponds to about 10 percent of the total daily demand energy for the location. This can be determined for the highest demand season or period or the most mismatched season or period based on the above-determined curves. In the above example, if the total daily-demand energy during the highest demand season or period is 33,000 kW-Hr for a given day, the expected storage tank volume capacity needed would be based on 10% of that amount, which is equal to about 3,300 kW-Hr. Using this amount, and a preferred pressure in the tank of 600 psig, it can be estimated that for purposes of the initial design, the tank should have more than about 90,000 cubic feet of space, which, in the example, can be supplied by multiple 10 feet diameter tanks.

Also, the method preferably attempts to select the most efficient wind turbine that should be used. This is preferably done by taking into consideration the manufacturer's specifications regarding the cut-in, constant, and cut off wind velocities, as discussed above, as well as the overall power output capacity of the wind turbine, and comparing them to the wind availability histories. In this respect, one factor that is preferably considered is how closely matched the wind turbine is to the wind availability histories for the given location, i.e., how closely matched the average wind velocities are to the functional velocity ranges of the wind turbine in question.

For example, if the average wind speed is consistently above 35 feet per second, it would not be efficient to select a wind turbine that operates most efficiently at a wind speed below 35 feet per second, and which has a constant power output range of between 35 feet per second and 75 feet per second. Such a turbine would not produce a proportional increase in power when the wind speed exceeds 35 feet per second. Likewise, if the wind speed is consistently below 20 feet per second, it would not be wise to pay more money to install a wind turbine that is able to generate power more effectively at wind speeds exceeding 50 feet per second.

To select the right wind turbine, the method contemplates that different types of wind turbines and their performance specifications should be compared, and then a determination should be made based on the wind histories that are to be studied for that particular location. While the present method does not rule out the possibility that different types of wind turbines can be installed in a single application for different seasons (so that one type of wind turbine can be operated during one season and another type can be operated during another season), for purposes of showing how the present system is preferably coordinated and installed, it will be assumed that only one type of wind turbine will be installed for the entire system.

Next, the method contemplates that the daily wind power availability and energy demand histories for each of the seasons or periods be compared and analyzed for purposes of determining the amount of energy needed, and how many windmills of each type would have to be installed to satisfy the worst case scenarios during any given time. As a starting point, it is significant to note that in the above example the worst mismatch between energy supply and demand is during the windy season, not the less windy season. On the other hand, the best-case scenario from the standpoint of a mismatch is the less windy season, i.e., the waveforms of the supply and demand history curves are better correlated. Accordingly, in developing the system, greater focus can be placed on the most mismatched season, since the worst-case scenario is likely to control the design for the entire system. While the other seasons or periods should be considered, the analysis preferably focuses initially on the worst-case season or period, before analyzing the other seasons or periods.

The initial task is to determine the intercept area of all windmills to be installed, based on the wind power availability and energy demand curves, so that the total number of windmills that will need to be installed can be determined. Then, it can also be determined how many immediate use stations and how many energy storage stations should be installed, i.e., a ratio, based on the same criteria.

The total intercept area which can be used to determine how many windmills to install, i.e., based on the surface area of the windmill blades, can generally be estimated based on the following formula: Area=$X*P/(C*0.5*Rho*U^3)$, where X is a factor that takes into account the mismatching of the waveforms on a given day and helps determine the optimum number of windmills to be installed, P is the peak power demand for the period in question, C is 0.5 (for a 600 kW wind turbine), "Rho" is 0.076 lbs-mass/cu.ft., and U is 50 ft/second. The formula also assumes that 1 sq. ft.=144 sq. in., 1 hp=550 ft.-lbs/second, 1 kW=0.746 hp, and 1 hour=3,600 seconds.

In the example above involving a day during the windy season, the starting value for the X-factor will initially be estimated to be 3.0. The selection of the starting X-factor is at first subjective, in that an initial estimate must be made based on how well or how poorly correlated the supply and demand curves appear to be, as well as how much wind overall might be available at that location, before a more accurate determination of the actual intercept area can be determined by using an iterative process. This estimate can be based on the following:

If there is a near perfect match between the worst-case supply and demand curves, the starting X-factor should be about 1.0 to 2.0. Whether the factor is closer to 1.0 or closer to 2.0 can depend on whether the curves are perfectly matched, or close to perfectly matched. It can also depend on how much wind is actually available at that location. That is, even if the curves are well matched, if the wind velocities are consistently low, the number of windmills that have to be installed may have to be increased to generate enough wind power to meet the demand, thereby making it probable that a higher X factor, i.e., closer to 2.0, would have to be used to calculate the intercept area. Choosing a factor closer to 1.0 essentially means that it is believed that, based on the supply and demand curves, the design can be selected using few if any energy storage stations, since most if not all of the needed power would be capable of being generated by the immediate use stations. Since immediate use stations are less expensive to install and more energy efficient than energy storage stations, it would be most cost-effective to do this. Nevertheless, an analysis would still have to take into account all of the days of each season or period, and the daily worst-case scenarios and averages for those seasons or periods, before a final solution can be developed.

If the mismatch between the worst-case supply and demand curves is moderate, the starting X-factor should be about 2.0 to 3.0. Again, whether the amount is closer to 2.0 or 3.0 may depend on several factors, including how much wind is actually available. On the other hand, if the mismatch is severe, the starting X-factor should be about 4.0. If the mismatch is even more severe, the starting X-factor could be as high as about 6.0, although at this point, the X-factor is likely to be too high for the system to be designed in an efficient and cost-effective manner. Accordingly, it is recommended that the starting X-factor be no more than about 4.0, even if the mismatch is severe, so that more accurate means of designing the system might be used to make the necessary adjustments.

An additional factor that should be taken into account at this point is the energy contribution that can be made by solar power, as well as the other heat sources. As mentioned above, one of the heating systems used to boost the amount of energy supplied from storage involves the collection of solar energy, i.e., to heat the compressed air in the storage tanks. Accordingly, based on a separate study of the availability of solar energy during an average day during that season or period, another factor that can be taken into account is the contribution that can be made by solar power to the efficiency and overall availability of energy from storage.

For example, if the solar history chart which tracks the availability of the sun indicates that during the windy season there is readily available sufficient solar energy during the middle of the day to boost the energy output from the storage tank, the X-factor to be applied can be reduced appropriately. That is, even if the energy supply and demand curves are not well correlated during that time, if there is sufficient solar energy available during the same period, i.e., where the wind may be least available, or at least when the difference between supply and demand may be the greatest, the comparison should take this into account.

Based on these additional factors, the selection of 3.0 as the starting X-factor takes into account the existence of sufficient solar energy during the middle of the day to make up for the greatest mismatch occurring at the same time. That is, given that the worst case scenario in this example is the windy season, and the wind power availability and energy demand curves show the greatest mismatch during the middle of the day, it might at first be thought that the starting X-factor should be more like 4.0, but given that the maximum solar energy supply is also likely to be available during the middle of the day, a subjective determination can be made that the starting X-factor can be reduced to about 3.0. That is, based on the above reasons, it is likely that the factor of 4.0 for a poorly correlated location can be reduced to about a factor of 3.0, since during the worst case scenario for wind availability, there is likely to be the best case scenario for solar energy availability.

Based on the above formula, and a starting X-factor of 3.0, with the peak energy demand (P) for the period in question being 2,640 kW, the total intercept area needed for the system (Area) can initially be estimated as being about 52,830 square feet. Using this number, and the manufacturing specifications for the wind turbines that are to be installed, it can then be estimated how many total number of windmills may be needed to supply energy on a continuous and uninterrupted basis, even during the worst case days and seasons. That is, once the total intercept area is determined to indicate the total wind power that needs to be generated to meet demand, the total amount can be divided by the per-unit capacity of each selected wind turbine to determine the approximate number of wind turbines that should be installed for the entire system. For example, if each wind turbine is assumed to have a little more than about 500 square feet of intercept area, the system design could begin with the assumption that about 100 total wind turbines will be needed to supply the necessary wind power for the entire system.

Once the total number of windmill stations to be installed is estimated, the next step is to determine how many should be immediate use stations and how many should be energy storage stations. In this respect, the method preferably takes into account that the energy extracted from energy storage is typically less than 40% efficient compared to energy generated for immediate use. Accordingly, the determination of any ratio between energy for immediate use and energy for storage should take into account the fact that energy derived from storage is much less efficient when compared to energy generated for immediate use.

In this respect, the present invention preferably makes another assumption based on the fact that the energy storage stations are going to be less efficient than the immediate use stations in generating electricity. That is, the present invention contemplates that in most cases it is desirable to have more immediate use stations than energy storage stations, so that there is greater reliance upon energy from the immediate use stations than the energy storage stations. In the example above, the ratio that has been used is 65% of the available windmill stations should be dedicated to energy for immediate use, and that about 35% of the available windmill stations should be dedicated to energy for storage. Proportionally reducing the number of energy storage stations enables the wind power conversion to be more efficient. Nevertheless, the present invention also contemplates that percentages other than 65% for immediate use and 35% for energy storage can be used, depending on the demand histories and needs of the system.

In the example above, based on a ratio of 65% immediate use and 35% energy storage, and an estimated need for a total of 100 windmill stations, the initial estimate for the number of windmill stations of each type would be 65 immediate use stations, and 35 energy storage stations.

Because the X-factor is only estimated initially, however, this only begins the iterative process. The iterative process preferably takes into account data for every day of every season or period, and uses that data to make adjustments to the X-factor, as well as other factors, if necessary. The adjustments are preferably based on the initial estimate of the total number of windmills to be installed and whether that actually satisfies or does not satisfy the energy demands for the location during the worst case days, seasons or periods. If the estimate does actually satisfy the worst-case scenarios, the X-factor will not likely have to be adjusted, and the total number of windmills to be installed can remain unchanged. If, on the other hand, the calculations show that the initial determination of the total number of windmills does not satisfy the worst-case days, seasons or periods, the X-factor can be adjusted, either up or down, depending on several efficiency factors, as discussed below.

To make the appropriate adjustments to the X-factor, and to determine the optimum number of windmill stations to be installed, to make the system function efficiently throughout the entire season, the following factors are preferably considered:

In addition to an initial estimate of the total number of windmill stations to be installed, an initial starting point for determining the optimum ratio between the number of immediate use stations to be installed and the number of energy storage stations to be installed should be calculated. In this respect, the starting ratio upon which the iterative process should begin, in the preferred embodiment, is 65% immediate use stations and 35% energy storage stations, which, as discussed above, means that of the initial determination that 100 total windmills will be needed, something like 65 immediate use stations and 35 energy storage stations will be needed.

Based on the initial estimates of the total number of windmills for each type, it will then be necessary to continue the iterative process by using those figures to estimate the total supply of energy that can be generated by such a system, and compare that amount to the energy demand histories for each day. That is, based on having an estimated 65 immediate use stations and 35 energy storage stations, and knowing how much energy can be supplied by each windmill, one can then estimate the total amount of wind power that may be available at any given time, based on actual wind availability conditions. That is, curves similar to those shown in FIGS. 7 and 8, which track the wind availability histories for any given day, can be generated to show how much wind power would be available from such a system at any given time of the day. In turn, this information can be used to determine how much electrical power can be generated by such a system, including how much can be generated by the immediate use stations, and how much can be generated by the energy storage stations, at any given time. Curves that show how much electrical power is available at any given time, on any given day, can then be prepared.

Next, the curves that show how much actual electrical power can be generated by the initial design of the system at any given time can then be compared and analyzed with the demand histories for the same days. Doing this, in connection with knowing the ratio between the immediate use and energy storage stations, can help determine how much of the total energy will be dedicated for immediate use, and how much will be dedicated for storage, as well as how much energy in storage will have to be used to make up for any deficiency in the immediate use supply. That is, for any given time interval, which in the preferred embodiment is every three minutes, it can be determined whether and to what extent the electrical power generated by the immediate use stations is sufficient to meet the power demands on the system, and If not, how much energy from storage would need to be supplied to make up for the deficiency in power supplied by the immediate use stations. What this can help determine and plot is a curve showing the delta of how much energy is being added into storage at any given time, minus how much energy is being subtracted through usage, over and beyond that which is supplied by the immediate use stations.

Such a hypothetical curve, which effectively shows the amount of standby energy stored in the storage tank, is shown in FIG. 12. This particular curve plots the amount of energy available in storage at any given time of the day, based on a starting X-factor of about 3.0. In this particular case, it can be seen that the design appears to be relatively close to what an optimum design might encompass, but is slightly under-designed, because the curve drops below zero at about 1500 hours. That is, it can be seen that during this particular day, the curve stays positive until about 1500 hours, when the supply of compressed air in the hypothetical tank runs out. Although the amount recovers quickly, i.e., at about 1800 hours, there will be a period of about three hours where energy is not available.

FIG. 13, on the other hand, shows how the curve in FIG. 12 can be adjusted upward by about 10 percent, i.e., by multiplying the X factor by 1.1, for a total X factor of about 3.3. It can be seen in this figure the curve never goes below zero, indicating that the amount of energy in storage does not run out. It also shows that the curve went close to zero, indicating that the system was efficient in that almost all the compressed air in the tank was used at some short time interval. Also, other adjustments, such as increasing the storage tank size, and others to be discussed, can prevent the curve on the chart from going negative during that period.

Another factor that makes this curve relatively close to what would be desired is the fact that the amount of energy in storage at the beginning and end of this 24-hour period is substantially the same. That is, at 0 hours, the total amount of energy in storage is about 2,200 kW-Hr, and at 2400 hours, which is the end of the same day, after energy is added into and subtracted from storage, the total amount of energy in storage is about 2,200 kW-Hr. What this means is that if the same or similar daily supply and demand curves existed repeatedly during the season or period, one could expect that the delta between energy in and energy out might remain substantially the same throughout most of that season or period.

The above information shows that a good design for the windy season might be based on an X factor of about 3.3, or 10 percent more intercept area than originally estimated, as shown in FIG. 13. Accordingly, given that the total estimated number of windmills to install was 100, with 65 being immediate use stations, and 35 being energy storage stations, it can be seen that a better design for this application, based on the above mentioned adjustments, might be more like a total of 110 windmills, including 71 immediate use stations, and 39 energy storage stations.

FIGS. 14 and 15 show the curve as the X factor is adjusted even higher. FIG. 14 shows the X factor increased by 20% to about 3.6, and FIG. 15 shows the X factor increased by 30% to about 3.9. These examples show that an increase in the X factor, which means an increase in intercept area, and therefore, an increase in the total number of windmills installed, would raise the curve to the point where the total amount of energy in the storage tank would be higher and higher as the day progresses. One can see that for this particular day, the delta of energy in exceeds the energy out, and that therefore, these designs would be inefficient for that period, since if the same conditions existed over time, the amount of energy in the tank would steadily increase and therefore have to be vented.

Other means of adjusting the system to account for the curve going negative are also within the contemplation of the present invention. For example, the capacity of the propane burner that supplies supplemental low-level power over the entire 24-hour period can be increased so that greater amounts of supplemental energy can be provided at any given time.

The other heat sources can also be made more powerful or efficient to enable additional power boosts in the form of additional stored heat energy in the tank. In this respect, another consideration that should be taken into account relates to the relative contributions that can be made by the heating systems that are intended to be used. That is, not only should the solar collector be considered, but also the impact of the other heating mechanisms, including the use of waste heat from the compressor, and the energy provided by a separate heater, such as the fossil fuel burner.

In FIGS. 16 and 17, which are for the windy season, hypothetical examples of the amount of power that might be available on standby inside the storage tank are shown. What is being compared is a system having a solar heater verses one that does not (both have auxiliary burners).

In FIG. 16, for instance, the availability of energy in the storage tank when using an appropriately sized tank, along with a solar heater and an auxiliary fossil fuel burner, is shown by the curve. The curve generally shows that the supply of energy in the tank is never depleted over the course of an average day. It also specifically shows the following: from midnight to about 2:00 a.m., energy is being slowly expended (as shown by the downward curve); from about 2:00 a.m. to about 7:30 a.m., energy is being supplied into the tank (as shown by the upward curve); from about 4:00 a.m. to about 12:00 p.m., energy generated for storage exceeds the maximum capacity of the tank (as shown by the straight curve), wherein excess energy would have to be vented; from about 12:00 p.m. to about 4:00 p.m., energy being used substantially exceeds supply (as shown by the steep downward curve); from about 4:00 p.m. to about 6:00 p.m., the stored energy level fluctuates between energy being expended and supplied; from about 6:00 p.m. to about 9:00 p.m., energy is being restored into the tank (as shown by the sharp upward curve); and from about 9:00 p.m. to midnight, energy is being slowly expended.

In comparison to FIG. 16, FIG. 17 shows the availability of energy in the storage tank when no solar heater is used, but an auxiliary fossil fuel burner is used. The curve shows that there is a significant depletion of energy in the storage tank during the late afternoon and evening hours which would cause the system to fail, i.e., be unable to provide energy on a continuous basis. That is, the energy stored in the tank would run out, i.e., the energy demand would exceed energy available from both the immediate use stations and the storage tank. In particular, the curve shows that a significant amount of supplemental energy from a separate energy supply, such as a propane heater, would have to be used to make up for the loss of stored energy. The auxiliary electrical generator system could also be used. This indicates the need for a combination of the solar heater and the auxiliary fossil fuel burner to provide the necessary heat to the tank to enable the system to be run on a continuous basis, and/or the need for an auxiliary electrical generator system.

This analysis has thus far taken into account a single day that might be considered one of the worst-case days, i.e., during the worst-case season. The iterative process, however, is not complete until the same analysis discussed above is repeated for each day of each season or period. That is, because the wind availability and energy demand histories will tend to be different at different times of the year, as well as from day to day, it will be necessary to repeat the above method to come up with an approximation for a design where the energy supply curve for the storage tank never goes below zero on any day during the course of an entire year. That is, even though the calculations are initially made for the worst case days, it is usually necessary to run the same analysis for each day of the year, so that the collective effect of the supply and demand curves being repeated day after day can be observed and taken into account.

In this respect, it can be seen that in any analysis, the extent to which the supply and demand curves vary may depend on how much energy in storage is being added and subtracted over time. That is, as discussed above, since the supply and demand curves actually show events that are extended along a continuum that never ends, it is necessary to consider the cumulative effect of the daily supply and demand curves, with energy being added and subtracted over the course of the entire year, to determine whether any further adjustments have to be made to ensure that energy in storage never runs out. This can include, for example, making further adjustments to the X-factor and the wind intercept area (the total number of windmills to be installed), the size of the storage tank, the size of the solar collectors, the ratio between the immediate use and energy storage stations, the size of the propane burner, the size of the fossil fuel heater, the capacity and specifications of the wind turbines, etc.

The adjustments that have to be made should also take into account changes that may need to be made from the standpoint of both increasing and decreasing the amount of energy being supplied into storage by the system. That is, because there are likely to be fluctuations in the supply and demand curves between one day to another, during different times of the year, more energy in storage may need to be added during one period, while too much energy in storage may be generated during another period, which would require a reduction in energy being supplied to storage. The present invention preferably takes into account adjustments for either condition.

This information can also be useful in being able to make additional adjustments to the system to account for the inefficiencies that can result from designing a system around the worst-case scenario. That is, by designing for the worst case scenario, the system may end up being significantly over-designed during the remaining periods of the year, including the best case seasons or periods, which can occur for a proportionally longer period of time during the year than the worst case seasons or periods. During the other better-matched seasons or periods, if the same system that has been designed for the worst-case scenario is used, there is likely to be extra energy produced by the system that will go unused, and therefore, have to be vented or stored in batteries.

For example, any time that the supply of energy from the immediate use stations exceeds energy demand, energy will be wasted. This may make it advantageous in some situations to install batteries, or allowing for an appropriate number of windmill stations to be shut down during those periods. Likewise, whenever the power generated by the energy storage stations exceeds the maximum storage capacity of the tank, a venting means would have to be used to release excess air from the tank. In the alternative, an appropriate number of energy storage stations could be shut off during those times.

Because of these inefficiencies, the present invention is preferably designed to incorporate a certain number of hybrid stations that can be used to further adjust the ratio of immediate use and energy storage stations, as discussed below.

F. Coordinating the Use of Hybrid Stations:

The present invention contemplates using a predetermined number of hybrid stations to make it possible for the system to be more efficiently designed and used. As discussed above, hybrid stations are able to switch between energy generated for immediate use and energy generated for storage, and to apportion them simultaneously. The hybrid stations are helpful because they can be used to offset the extreme conditions, i.e., the worst-case scenarios that may occur only during a few months out of the year, upon which the overall system is required to be designed. During the rest of the year, the wind availability and energy demand curves may follow a much more correlated pattern, in which case the overall system may need to be adjusted during those times, to be able to operate on a more cost-effective and energy-efficient basis throughout the entire year.

In the above example, based on the wind supply and energy demand curves during the windy season, it was determined to have been appropriate to install 71 immediate use stations and 39 energy storage stations. On the other hand, during the less windy season, where the curves are well correlated, the following calculations may have been made: Based on the supply and demand curves being well correlated, the above method may have determined that the starting X-factor could have been more like 2.2. Accordingly, if energy demand is assumed to be the same during the less windy season, with the peak energy demand being about 2,640 kW, the total estimated number of windmills that would need to be available during the less windy season may have been about one-third that needed during the windy season, i.e., a total of about 73 windmills, with 48 being immediate use stations and 25 being energy storage stations.

Clearly, during the less windy season, not all of the windmill stations would have to be operational to meet the energy demands. In fact, if there are enough immediate use stations installed, there may be little or no need for any energy storage stations to be operated during the less windy season. That is, if the number of immediate use stations based on the worst-case season is 71 immediate use stations, those same 71 immediate use stations may provide enough energy on a continuous and uninterrupted basis during the less windy season such that little or no energy from storage would be needed. Since the immediate use stations are more efficient, this may be the more desirable arrangement during the less windy season.

Moreover, even if the 71 immediate use stations are not quite enough to supply the needed power to the area without any energy storage stations, some of the energy storage stations could initially be installed as hybrid stations so that during the less windy season, those hybrid stations can be converted to immediate use stations to provide the necessary energy. For example, if based on how well correlated the supply and demand curves are, and how much the demands are during the less windy season, it is determined that a total of 77 immediate use stations could provide the necessary electrical power on a continuous and uninterrupted basis, the system could initially be designed with 71 immediate use stations, 33 energy storage stations, and 6 hybrid stations, for a total of 110 windmill stations. This way, during the windy season, the hybrid stations can be operated as energy storage stations to make the ratio 71 immediate use stations and 39 energy storage stations, as determined above, while during the less windy season, the hybrid stations can be operated as immediate use stations to make the ratio 77 immediate use stations and 33 energy storage stations. In such case, most if not all of the energy storage stations may not have to be operated at all during the less windy season, i.e., they could be shut off, since most, if not all of the energy, could be provided by the immediate use stations. Some energy storage stations, nevertheless, should remain operational to account for circumstances where there might be an unpredictable dip in wind supply or peak in demand.

In this respect, another situation where the hybrid stations can be used is where after doing the above iterations, it is determined that the optimum ratio between immediate use and energy storage stations differs from one season to the next. Again, because the immediate use stations are less expensive to install and more cost-efficient to operate, it may be possible, such as in situations where the supply and demand curves are well correlated, to rely for a greater percentage of the overall energy supply on the immediate use stations than the energy storage stations.

Assume, for example, a situation where it is determined that the optimum ratio for one season is fifty-fifty between immediate use and energy storage, i.e., 50 immediate use stations and 50 energy storage stations, while during another season, the optimum ratio might be 30% immediate use and 70% energy storage, i.e., 30 immediate use stations and 70 energy storage stations. In such case, without any hybrid stations, the system would likely have to be over-designed based on the worst-case scenario, i.e., the system would probably have to be designed with 120 windmill stations, including 50 immediate use stations (to cover the fifty-fifty ratio during the summer season), and 70 energy storage stations (to cover the thirty-seventy ratio during the winter season). What this means is that to design the system for this application, 120 windmill stations may have to be installed, even though only 100 stations or less would be needed at any given time.

On the other hand, by using a number of hybrid stations, the total number of stations that would have to be installed can be minimized. In the example above, the system can be designed with a total of 100 windmill stations, not 120, i.e., by installing 30 immediate use stations, 50 energy storage stations, and 20 hybrid stations. This way, during any given season, the total number of stations that have been installed will not exceed the total number of stations that are required to be operational at any given time.

For example, to supply power during the summer season, the 20 hybrid stations can be converted to immediate use stations, so that effectively, there are 50 immediate use stations, including 30 actual immediate use stations and 20 hybrid stations (switched to immediate use), and 50 energy storage stations. Likewise, during the winter season, the 20 hybrid stations can be converted to energy storage stations, so that effectively, there are 70 energy storage stations, including 50 actual energy storage stations and 20 hybrid stations (switched to energy storage), and 30 immediate use stations. Using hybrid stations in this manner enables the system to be more efficiently designed and used.

In either case, the present invention contemplates that the system can be configured to maximize the amount of energy that can be derived from wind energy, by taking into account when and how much wind may be available at any given time, and when and how much energy is in demand at any given time, so that the system can be coordinated and operated efficiently and reliably to provide continuous and uninterrupted power to locations remote from the power grid. While it is often difficult to predict when and how much the wind will blow, and the extent of the demand periods, the present invention seeks to use reliable data as a means of calculating certain averages, i.e., relating to the wind supply and energy demand, and using those averages as a means of creating an optimum system that can be applied to virtually any application.

What is claimed is:

1. A method of operating a wind farm having a plurality of wind turbine stations capable of providing energy to a predetermined location, comprising:
   a. obtaining wind availability histories for the wind farm location during predetermined time intervals;
   b. determining energy demand histories for the predetermined location during said predetermined time intervals;
   c. comparing the wind availability histories with the energy demand histories for said predetermined time intervals, and determining during which period or periods of the year the wind availability histories are least closely matched with the energy demand histories, and during which period or periods of the year the wind availability histories are most closely matched with the energy demand histories;
   d. determining the total number of wind turbines to be installed and/or used on said wind farm, based upon the total intercept area of each wind turbine to be used, and taking into account the wind availability and energy demand histories and comparisons during the least closely matched period or periods of the year;
   e. determining a ratio between the total number of wind turbines to be dedicated to providing energy for immediate use, and the total number of wind turbines to be dedicated to providing energy for storage, taking into account the wind availability and energy demand histories and comparisons during the least closely matched period or periods of the year;
   f. based on said ratio, and taking into account the wind availability and energy demand histories and comparisons during the least closely matched period or periods of the year, providing the following:
   a predetermined number of wind turbine stations dedicated to providing energy for immediate use; and
   a predetermined number of wind turbine stations dedicated to providing energy for energy storage.

2. The method of claim 1, wherein the method comprises the additional step of using said ratio and providing a predetermined number of hybrid wind turbine stations dedicated to providing energy for immediate use and/or energy storage based on said ratio, either in addition to or in place of the predetermined number of wind turbine stations for immediate use, and/or the predetermined number of wind turbine stations for storage, which can include replacing all of the wind turbine stations of each type with hybrid wind turbine stations.

3. The method of claim 1, wherein said predetermined time intervals are 24 hour periods, and wherein said period or periods of the year comprise multiple predetermined time intervals, and/or comprise seasons of the year.

4. The method of claim 1, wherein the total number of wind turbines is determined based on the formula: Intercept Area=$X*P/(C*0.5*Rho*U^3)$, where X is a factor that takes into account the comparison between the wind availability and energy demand histories, P is the peak energy demand for a given predetermined time interval, C is based on the size of the selected wind turbine, "Rho" is 0.076 lbs-mass/cu.ft., and U is 50 ft/second.

5. The method of claim 4, wherein the starting X factor is determined based on whether there is a significant mismatch between the wind availability and energy demand histories during the predetermined time intervals, and/or takes into consideration the availability of other energy sources during the predetermined time intervals.

6. The method of claim 5, wherein an initial ratio is set to about 65% immediate use and about 35% energy storage, and the X factor is adjusted based on the wind availability and energy demand histories and comparisons for said period or periods of the year.

7. The method of claim 2, wherein said predetermined numbers of said immediate use, energy storage, and hybrid wind turbine stations for any given period or periods of the year are determined such that at any time, the amount of energy available in storage is calculated not to run out, wherein determining said predetermined numbers takes into account the following:
   a. determining the total number of wind turbine stations dedicated for immediate use and energy storage that will be needed to provide energy to the predetermined location on a continuous, uninterrupted basis, during the least closely matched period or periods;
   b. determining the total number of wind turbine stations dedicated for immediate use and energy storage that will be needed to provide energy to the predetermined location on a continuous, uninterrupted basis, during the most closely matched period or periods;
   c. determining the differences between the total numbers of immediate use and energy storage wind turbine stations that will be needed during the least closely matched and most closely matched period or periods; and
   d. providing an appropriate number of said hybrid wind turbine stations, which can be switched between providing energy for immediate use and energy for storage, based on the difference.

8. The method of claim 2, wherein during the most closely matched period or periods of the year, the system is set up such that when a predetermined number of said hybrid wind turbine stations is switched to provide energy for immediate use, the energy provided to the predetermined location can be provided exclusively by the immediate use wind turbine stations and the hybrid wind turbine stations that are switched to provide energy for immediate use.

9. The method of claim 1, further comprising determining a second ratio between the total number of wind turbines to be dedicated to providing energy for immediate use, and the total number of wind turbines to be dedicated to providing energy for energy storage, taking into account the wind availability and energy demand histories and comparisons during the most closely matched period or periods of the year.

10. A method of operating a wind farm having a plurality of wind turbine stations capable of providing energy to a predetermined location, comprising:
    a. obtaining wind availability histories for the wind farm location during predetermined time intervals, and converting said wind availability histories into wind power history curves for said predetermined time intervals;
    b. determining energy demand histories for the predetermined location during said predetermined time intervals, and converting said energy demand histories into energy demand curves for said predetermined time intervals;
    c. comparing the wind power history curves with the energy demand history curves for said predetermined time intervals, and determining during which period or periods of the year the wind power history curves are least closely matched with the energy demand history curves;
    d. determining the total number of wind turbines to be installed and/or used, based upon the total intercept area of each wind turbine to be used, and taking into account the wind power history and energy demand history curves and comparisons during said least closely matched period or periods of the year;
    e. determining the ratio between the total number of wind turbines to be dedicated to providing energy for immediate use, and the total number of wind turbines to be dedicated to providing energy for energy storage, taking into account the wind power history and energy demand history curves and comparisons during the least closely matched period or periods of the year; and
    f. providing a predetermined number of wind turbine stations dedicated to providing energy for immediate use, and providing a predetermined number of wind turbine stations dedicated to providing energy for energy storage, based on said ratio.

11. The method of claim 10, wherein the method comprises the additional step of providing a predetermined number of hybrid wind turbine stations that can be switched between providing energy for immediate use, and providing energy for storage, either in addition to or in place of the predetermined number of wind turbine stations for immediate use, and/or the predetermined number of wind turbine stations for storage, which can include replacing all of the wind turbine stations of each type with hybrid wind turbine stations.

12. The method of claim 10, wherein said predetermined time intervals are 24 hour periods, and said period or periods of the year comprise multiple predetermined time intervals, and/or comprise seasons of the year.

13. The method of claim 10, wherein the total number of wind turbines is determined based on the formula: Intercept Area=$X*P/(C*0.5*Rho*U^3)$, where X is a factor that takes into account the comparison between the wind power history and energy demand history curves, P is the peak energy demand for the predetermined time interval, C is based on the size of the selected wind turbine, "Rho" is 0.076 lbs-mass/cu.ft., and U is 50 ft/second.

14. The method of claim 13, wherein the starting X factor is determined based on whether there is a significant mismatch between the wind power history and energy demand history curves during the predetermined time intervals, and/or takes into consideration the availability of other energy sources during the predetermined time intervals.

15. The method of claim 14, wherein an initial ratio is set to about 65% immediate use and about 35% energy storage, and the X factor is adjusted based on the wind power history and energy demand history curves for said period or periods of the year.

16. A method of operating a wind farm having a plurality of wind turbine stations capable of providing energy to a predetermined location, comprising:
    a. obtaining wind availability histories for the wind farm location during predetermined time intervals;
    b. obtaining energy demand histories for the predetermined location during said predetermined time intervals;
    c. comparing the wind availability histories with the energy demand histories for said predetermined time intervals, and determining during which period or periods of the year the wind availability histories are least closely matched with the energy demand histories, and during which period or periods of the year the wind availability histories are most closely matched with the energy demand histories;
    d. determining the total number of wind turbines to be installed and/or used on said wind farm, based upon the total intercept area of each wind turbine to be used, and taking into account the wind availability and energy demand histories and comparisons;

e. determining a ratio between the total number of wind turbines to be used to provide energy for immediate use, and the total number of wind turbines to be used to provide energy for storage, taking into account the wind availability and energy demand histories and comparisons;

f. based on said ratio, and taking into account the wind availability and energy demand histories and comparisons, providing the following:
   1) a predetermined number of wind turbine stations for providing energy for immediate use;
   2) a predetermined number of wind turbine stations for providing energy for energy storage; and/or
   3) a predetermined number of hybrid wind turbine stations for providing energy for immediate use or storage.

17. The method of claim 16, wherein the total number of wind turbines is determined based on the formula: Intercept Area=$X*P/(C*0.5*Rho*U^3)$, where X is a factor that takes into account the comparison between the wind availability and energy demand histories, P is the peak energy demand for a given predetermined time interval, C is based on the size of the selected wind turbine, "Rho" is 0.076 lbs-mass/cu.ft., and U is 50ft/second.

18. The method of claim 17, wherein the starting X factor is determined based on whether there is a significant mismatch between the wind availability and energy demand histories during the predetermined time intervals, and/or takes into consideration the availability of other energy sources during the predetermined time intervals.

19. The method of claim 16, wherein said predetermined numbers of said immediate use, energy storage, and hybrid wind turbine stations for any given period or periods of the year are determined such that at any time, the amount of energy available in storage is calculated not to run out, wherein determining said predetermined numbers takes into account the following:

a. determining the total number of wind turbine stations for immediate use and energy storage that will be needed to provide energy to the predetermined location on a continuous, uninterrupted basis, during the least closely matched period or periods;

b. determining the total number of wind turbine stations for immediate use and energy storage that will be needed to provide energy to the predetermined location on a continuous, uninterrupted basis, during the most closely matched period or periods;

c. determining the differences between the total numbers of immediate use and energy storage wind turbine stations that will be needed during the least closely matched and most closely matched period or periods; and d. providing an appropriate number of said hybrid wind turbine stations, which can be switched between providing energy for immediate use and energy for storage, based on the difference.

20. The method of claim 16, wherein during the most closely matched period or periods of the year, the system is set up such that when a predetermined number of said hybrid wind turbine stations is switched to provide energy for immediate use, the energy provided to the predetermined location can be provided exclusively by the immediate use wind turbine stations and the hybrid wind turbine stations that are switched to provide energy for immediate use.

* * * * *

UNITED STATES PATENT AND TRADEMARK OFFICE
CERTIFICATE OF CORRECTION

| | | |
|---|---|---|
| PATENT NO. | : 7,250,691 B2 | Page 1 of 1 |
| APPLICATION NO. | : 11/450174 | |
| DATED | : July 31, 2007 | |
| INVENTOR(S) | : Ben M. Enis et al. | |

It is certified that error appears in the above-identified patent and that said Letters Patent is hereby corrected as shown below:

The first sentence of the specification beneath the title shall read as follows:

"This application is a Continuation of U.S. Patent Application Ser. No. 11/134,801, filed on May 20, 2005, which is a Continuation of U.S. Patent Application Ser. No. 10/263,848, filed on Oct. 4, 2002, which claims priority from U.S. Provisional Application Ser. Nos. 60/327,012, filed on Oct 5, 2001, and 60/408,876, filed on Sep. 9, 2002, all of which are incorporated herein by reference in their entirety."

Signed and Sealed this

Thirteenth Day of July, 2010

David J. Kappos
*Director of the United States Patent and Trademark Office*